United States Patent
Hahn et al.

(10) Patent No.: US 8,699,186 B1
(45) Date of Patent: Apr. 15, 2014

(54) DSA SUSPENSION WITH MID-LOAD BEAM MOUNTED DUAL ACTUATORS

(71) Applicant: Magnecomp Corporation, Murrieta, CA (US)

(72) Inventors: Peter Hahn, Wildomar, CA (US); Kuen Chee Ee, Chino, CA (US); Long Zhang, Murrieta, CA (US)

(73) Assignee: Magnecomp Corporation, Murrieta, CA (US)

( * ) Notice: Subject to any disclaimer, the term of this patent is extended or adjusted under 35 U.S.C. 154(b) by 0 days.

(21) Appl. No.: 13/774,630

(22) Filed: Feb. 22, 2013

(51) Int. Cl.
G11B 5/48 (2006.01)

(52) U.S. Cl.
USPC .................................. 360/244.9

(58) Field of Classification Search
USPC .................................. 360/244.9
See application file for complete search history.

(56) References Cited

U.S. PATENT DOCUMENTS

| | | | |
|---|---|---|---|
| 5,657,188 A | 8/1997 | Jurgenson et al. | |
| 6,157,522 A | 12/2000 | Murphy et al. | |
| 6,219,203 B1 | 4/2001 | Arya et al. | |
| 6,233,124 B1 * | 5/2001 | Budde et al. | 360/294.4 |
| 6,239,953 B1 | 5/2001 | Mei | |
| 6,278,587 B1 | 8/2001 | Mei | |
| 6,411,475 B1 | 6/2002 | Khan et al. | |
| 6,456,464 B1 | 9/2002 | Khan et al. | |
| 6,487,055 B1 | 11/2002 | Mei | |
| 6,590,748 B2 | 7/2003 | Murphy et al. | |
| 6,680,826 B2 | 1/2004 | Shiraishi et al. | |
| 6,731,472 B2 * | 5/2004 | Okamoto et al. | 360/294.3 |
| 6,760,194 B2 | 7/2004 | Shiraishi et al. | |
| 6,765,761 B2 | 7/2004 | Arya | |
| 6,778,362 B1 * | 8/2004 | Davis et al. | 360/244.8 |
| 6,785,096 B2 * | 8/2004 | Kuwajima et al. | 360/294.4 |
| 6,894,876 B1 | 5/2005 | Coon | |
| 7,006,333 B1 | 2/2006 | Summers | |
| 7,211,935 B1 | 5/2007 | Houk | |
| 7,218,481 B1 * | 5/2007 | Bennin et al. | 360/294.4 |
| 7,292,413 B1 | 11/2007 | Coon | |
| 7,459,835 B1 | 12/2008 | Mei et al. | |
| 7,459,965 B2 | 12/2008 | Sugano | |
| 7,551,404 B1 * | 6/2009 | Phu et al. | 360/266 |
| 7,595,965 B1 | 9/2009 | Kulangara et al. | |
| 7,663,843 B2 | 2/2010 | Yao | |
| 7,751,153 B1 | 7/2010 | Kulangara et al. | |
| 7,821,000 B2 | 10/2010 | Kloc et al. | |
| 7,843,666 B2 | 11/2010 | Yao et al. | |
| 8,134,809 B2 | 3/2012 | Yao et al. | |
| 8,331,060 B2 * | 12/2012 | Kashima | 360/294.4 |
| 8,335,055 B2 * | 12/2012 | Hanya et al. | 360/294.4 |
| 2004/0066585 A1 | 4/2004 | Shum | |
| 2007/0109690 A1 | 5/2007 | Yao et al. | |
| 2007/0223146 A1 | 9/2007 | Yao et al. | |
| 2008/0144224 A1 | 6/2008 | Yao | |
| 2009/0244786 A1 | 10/2009 | Hatch | |
| 2009/0316306 A1 | 12/2009 | Yao et al. | |
| 2010/0097726 A1 | 4/2010 | Greminger et al. | |
| 2010/0195251 A1 | 8/2010 | Nojima et al. | |
| 2010/0208390 A1 | 8/2010 | Hanya et al. | |
| 2010/0271732 A1 | 10/2010 | Fujimoto | |
| 2011/0141614 A1 | 6/2011 | Suzuki et al. | |

\* cited by examiner

*Primary Examiner* — Mark Blouin
(74) *Attorney, Agent, or Firm* — Intellectual Property Law Offices of Joel Voelzke, APC

(57) ABSTRACT

A dual stage microactuated (DSA) suspension has two microactuators which are located approximately mid-load beam, and which are close to the stiffening edge rails of the load beam. A vertically extending C-spring is formed in the rails adjacent the microactuators in order to allow the microactuators to expand and contract.

20 Claims, 34 Drawing Sheets

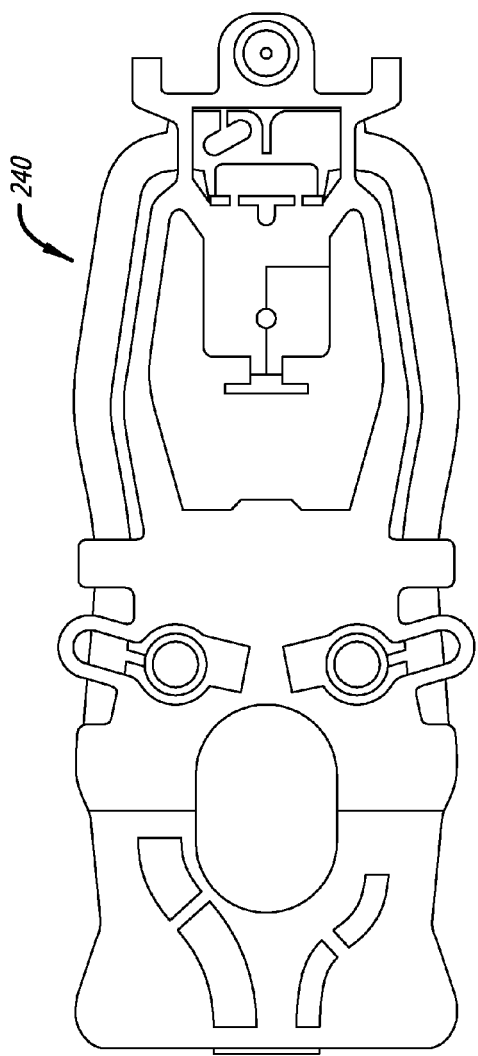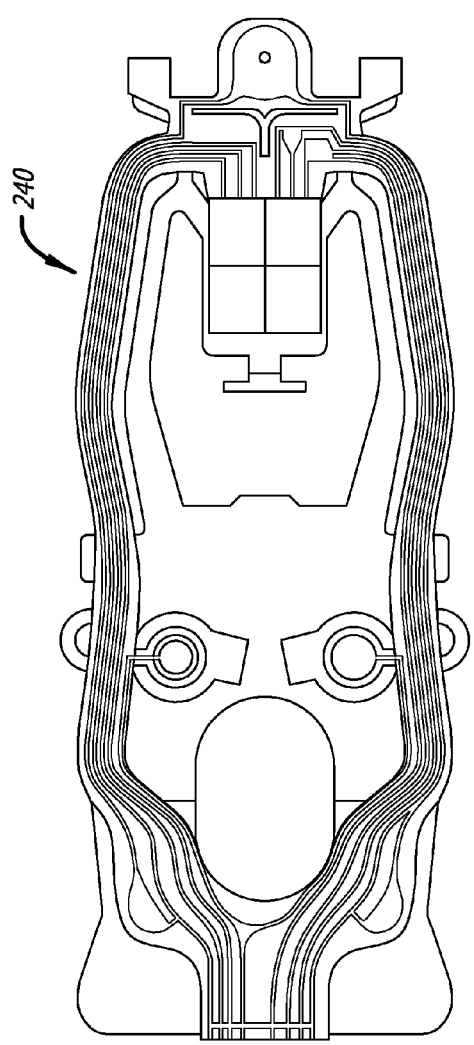
FIG. 6 — Gimbal Top
FIG. 7 — Gimbal Bottom

Gimbal Top

Gimbal Bottom

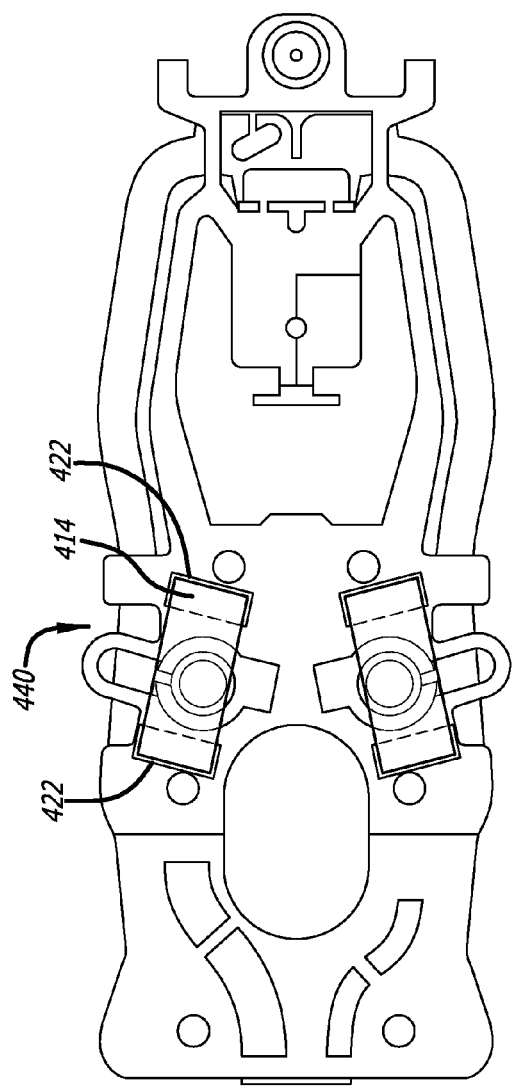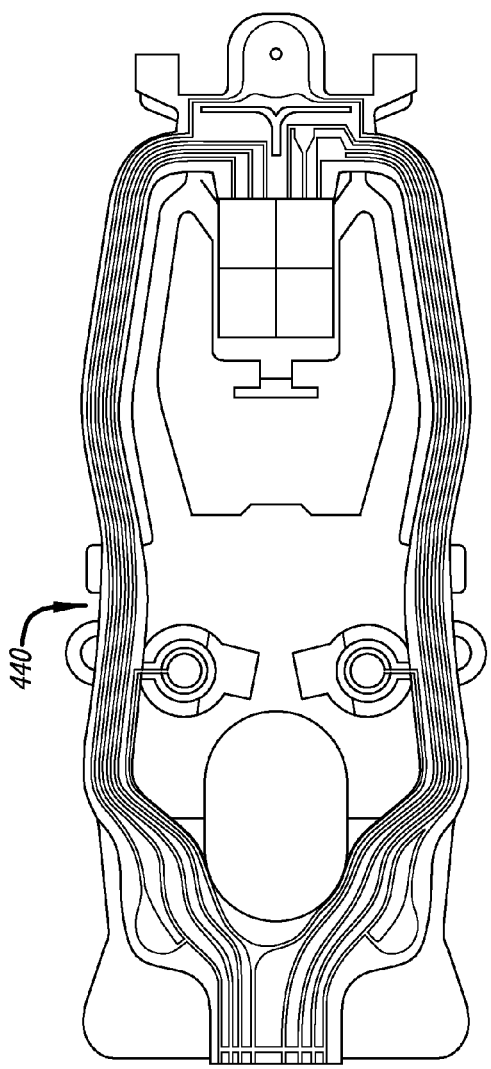

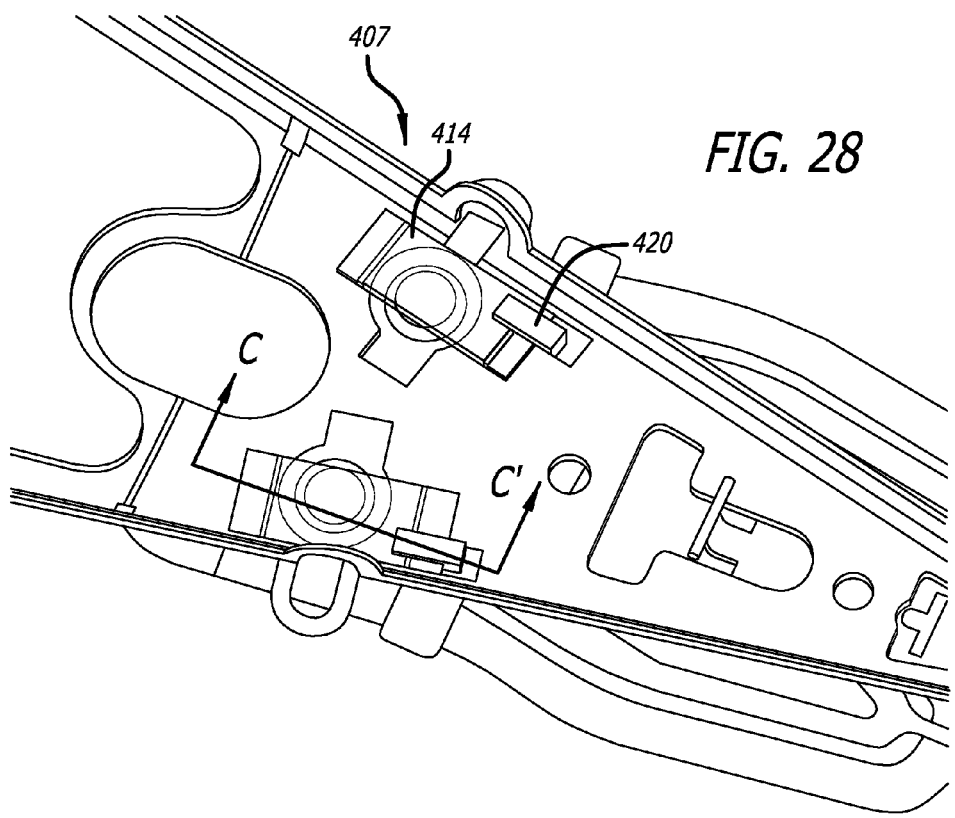
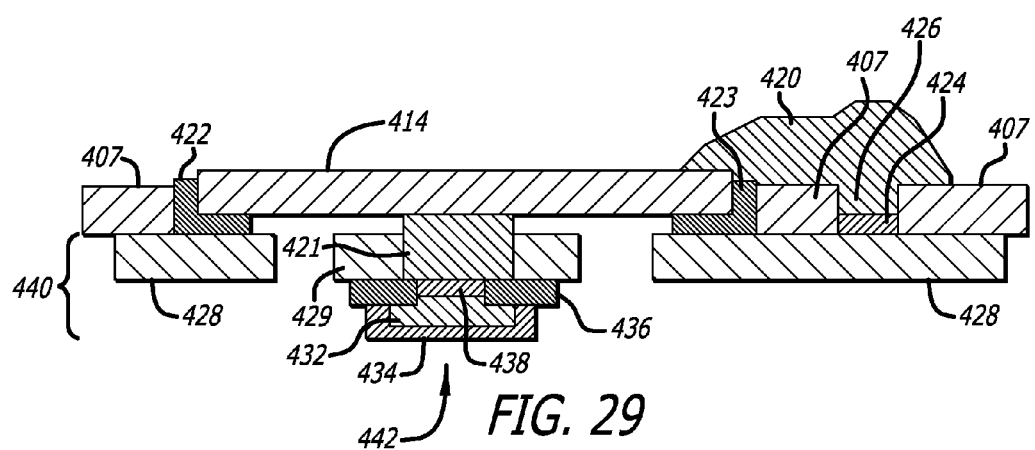

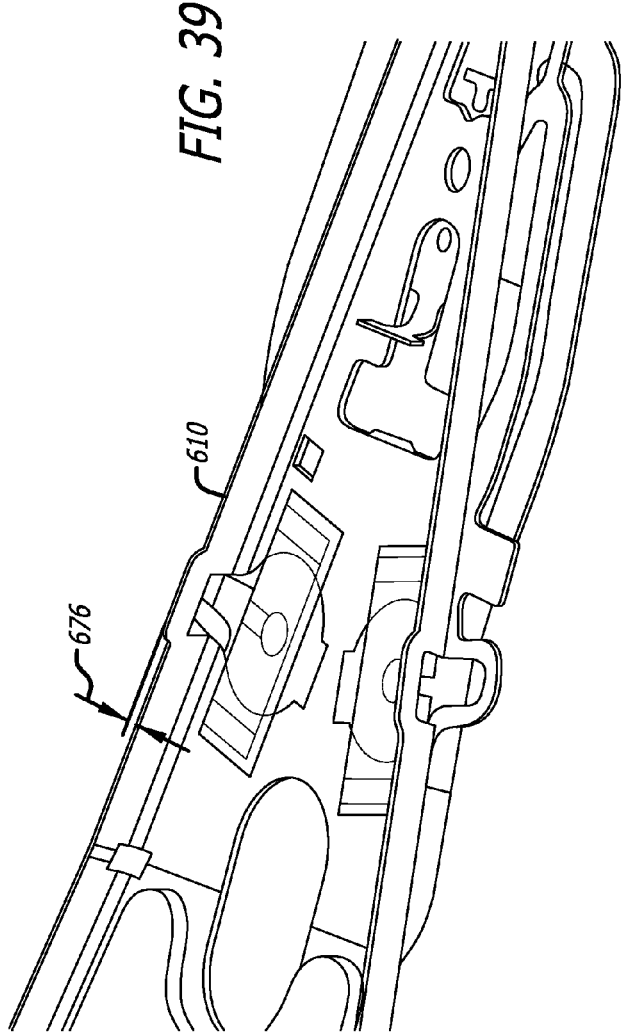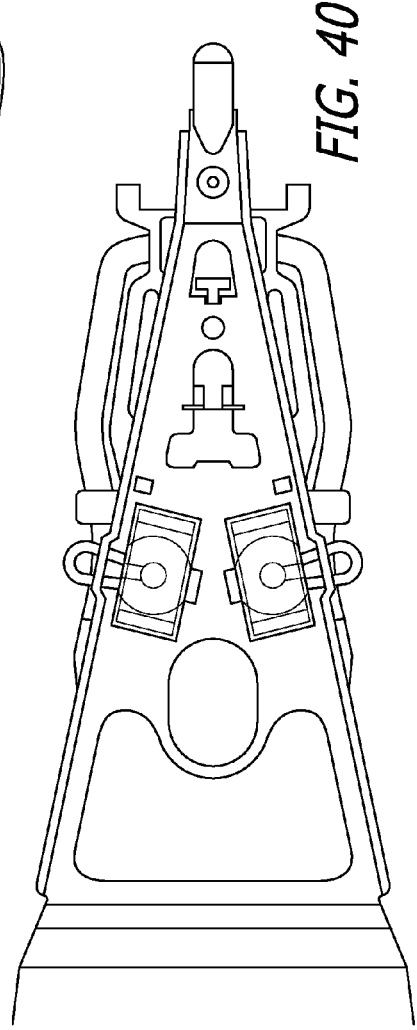

DSA SUSPENSION WITH MID-LOAD BEAM MOUNTED DUAL ACTUATORS

CROSS-REFERENCE TO RELATED APPLICATIONS

None

BACKGROUND OF THE INVENTION

1. Field of the Invention

This invention relates to the field of suspensions for disk drives. More particularly, this invention relates to the field of dual stage actuated (DSA) suspensions.

2. Description of Related Art

Magnetic hard disk drives and other types of spinning media drives such as optical disk drives are well known. FIG. 1 is an oblique view of an exemplary prior art hard disk drive and suspension. The prior art disk drive unit 100 includes a spinning magnetic disk 101 containing a pattern of magnetic ones and zeroes on it that constitutes the data stored on the disk drive. The magnetic disk is driven by a drive motor (not shown). Disk drive unit 100 further includes a disk drive suspension 105 to which a magnetic head slider (not shown) is mounted proximate a distal end of load beam 107. Suspension 105 is coupled to an actuator arm 103, which in turn is coupled to a voice coil motor 112 that moves the suspension 105 arcuately in order to position the head slider over the correct data track on data disk 101. The head slider is carried on a gimbal which allows the slider to pitch and roll so that it follows the proper data track on the disk, allowing for such variations as vibrations of the disk, inertial events such as bumping, and irregularities in the disk's surface.

Both single stage actuated disk drive suspensions and dual stage actuated (DSA) suspension are known. In a single stage actuated suspension, only voice coil motor 112 moves suspension 105.

In a DSA suspension, as for example in U.S. Pat. No. 7,459,835 issued to Mei et al. as well as many others, in addition to voice coil motor 112 which moves the entire suspension, at least one microactuator is located on the suspension in order to effect fine movements of the magnetic head slider to keep it properly aligned over the data track on the spinning disk. The microactuator(s) provide much finer control and much higher bandwidth of the servo control loop than does the voice coil motor alone, which effects relatively coarse movements of the suspension and hence the magnetic head slider. A piezoelectric element, sometimes referred to simply as a PZT, is often used as the microactuator motor, although other types of microactuator motors are possible. In the discussion that follows, for simplicity the microactuator will be referred to simply as a "PZT," although it will be understood that the microactuator need not be of the PZT type.

FIG. 2 is a top plan view of the prior art suspension 105 in FIG. 1. Two PZT microactuators 14 are affixed to suspension 105 on microactuator mounting shelves 18 that are formed within base plate 12, such that the PZTs span respective gaps in base plate 12. Microactuators 14 are affixed to mounting shelves 18 by non-conductive epoxy 16 at each end of the microactuators. The positive and negative electrical connections can be made from the PZTs to the suspension's flexible wiring trace and/or to the grounded base plate by a variety of techniques including those disclosed in commonly owned U.S. Pat. No. 7,751,153 to Kulangara et al.

Conventionally, the word "proximal" refers to being at a position that is relatively closer to the supported end of the suspension, i.e., closer to base plate 12; similarly, the word "distal" refers to being at a position that is relatively closer to the cantilevered end of the suspension, i.e., the end at which the head slider is located. Those words will be used herein consistent with that convention.

SUMMARY OF THE INVENTION

The present invention is directed to a suspension for a hard disk drive with the PZT microactuators placed in the middle of the load beam, closer to the head slider than in certain prior art designs, and away from each other and close to the edge rails. Placing the PZT microactuators close to the slider helps to decouple the PZT actuation from the head stack, and thus avoid exciting the arm modes at the head stack level during PZT-excitation FRF. Because PZT excitation feeds energy to excite the natural vibrational modes of various structural components of the head stack assembly (HSA) in a disk drive, by placing the PZTs away from the mount plate, separated therefrom by the suspension hinge and usually a conventional suspension damper, excitation of the PZTs cause less vibration of the HSA, and less transfer of vibration back from the HSA. Additionally, placing the PZTs apart from each other and close to the edge rails makes the structure stiffer, which helps secure a higher frequency (i.e., greater than 6 kHz) for the first bending mode, which is an important constraint in drive servo bandwidth.

Exemplary embodiments of the invention will be further described below with reference to the drawings, in which like numbers refer to like parts. The drawing figures might not be to scale, and certain components may be shown in generalized or schematic form and identified by commercial designations in the interest of clarity and conciseness.

BRIEF DESCRIPTION OF THE DRAWINGS

FIGS. 6 and 7 are top and bottom plan views, respectively, of the flexure 240 of the suspension of FIG. 3.

FIG. 24 is a top plan view of the flexure of the suspension of FIG. 23.

FIG. 25 is a bottom plan view of the flexure of the suspension of FIG. 23.

FIG. 28 is an oblique close-up view of the load beam of the suspension of FIG. 23.

FIG. 29 is a cross section view of the suspension of FIG. 28 taken along section line C-C'.

FIG. 39 is an oblique view of a suspension according to a fifth embodiment.

FIG. 40 is a top plan view of the suspension of FIG. 39.

DETAILED DESCRIPTION OF THE PREFERRED EMBODIMENTS

Figure 1:
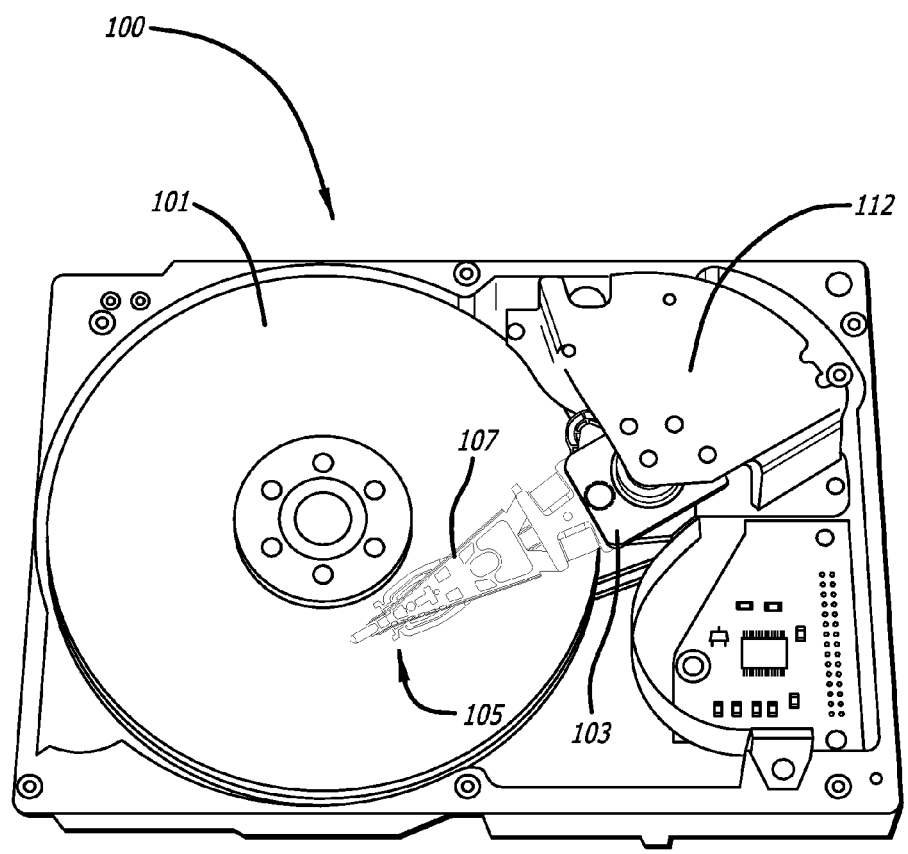
FIG. 1 is an oblique view of an exemplary prior art hard disk drive and suspension
Figure 2:
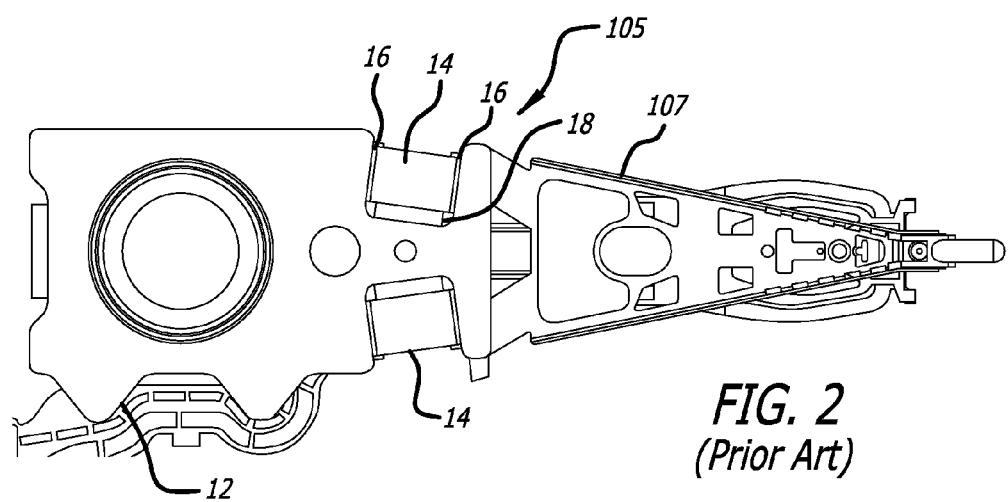
FIG. 2 is a top plan view of the prior art suspension 105 in FIG. 1.
Figure 3:
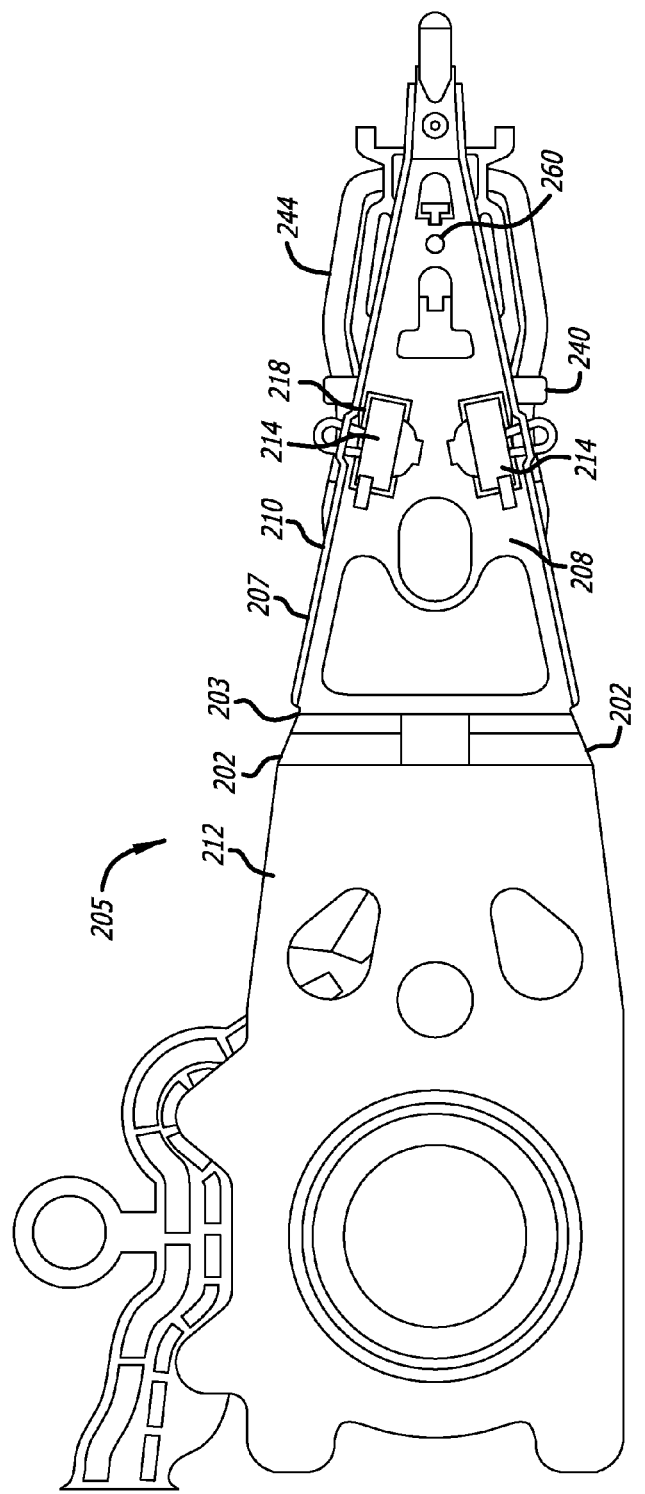
FIG. 3 is a top plan view of a suspension according to a first embodiment of the invention.
Figure 4:
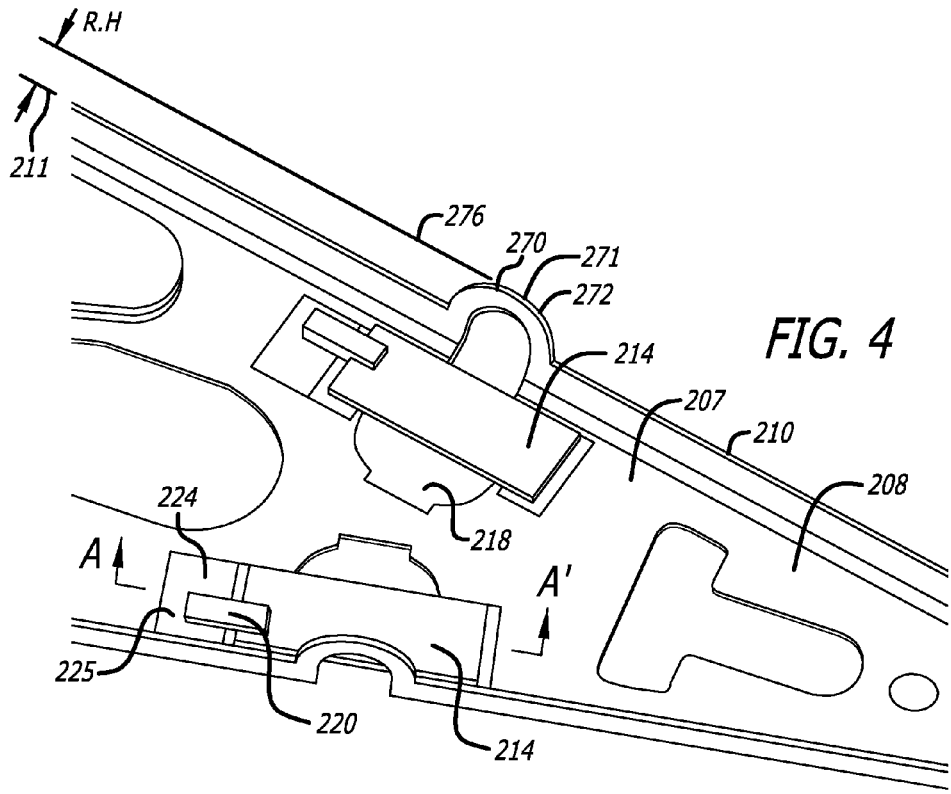
FIG. 4 is an oblique closeup view of the area around the microactuators in the suspension of FIG. 3 but without the flexure.

FIG. 3 is a top plan view of a suspension 205 according to a first embodiment of the invention, referred to as Design A, and FIG. 4 is an oblique close-up view of the area around the microactuators in the suspension of FIG. 3 but without the flexure. Suspension 205 includes base 212, load beam 207 connected to base 212 and having stiffening edge rails 210 to provide stiffness to load beam 207, springs or hinges 202 which connect load beam 207 to base 212, flexible electrical circuit 244 for electrical connection to a magnetic read/write transducer carried on a head slider (not shown), and a dimple 260 formed into the load beam on which the head pivot in preferably three rotational directions (pitch, roll, and yaw). Base 212 can be a plate-like mounting plate that will be swaged to an actuator arm, or can be one of other conventional base designs. Load beam 207 is typically made from stainless steel. Stiffening edge rails 210 are typically formed by folding a narrow outside strip of material to form an angle of 70-90 degrees with the major plane 208 of load beam 207. Stiffening rails 210 having a nominal height 211 above major plane 208. This much is conventional.

Load beam 207 has apertures 218 formed therein. Microactuators 214 are affixed onto load beam 207 at PZT mounting area 225 by non-conductive epoxy 222. Microactuators 214 are piezoelectric elements, and more particularly are bulk lead zirconate titanate (PZT) material in the illustrative embodiment. Other types of microactuators may be used, including electrostatic actuators, thermal actuators, and thin film PZTs including multi-layer PZTs. Throughout the remainder of this specification, the microactuators 214 will be referred to as PZTs 214 for brevity; it will be understood, however, that other types of microactuators could also be used. Mounting areas 225 can be either flat portions of the load beam 207 as illustrated, etched recessed shelves, or otherwise formed recessed shelves.

Figure 5:
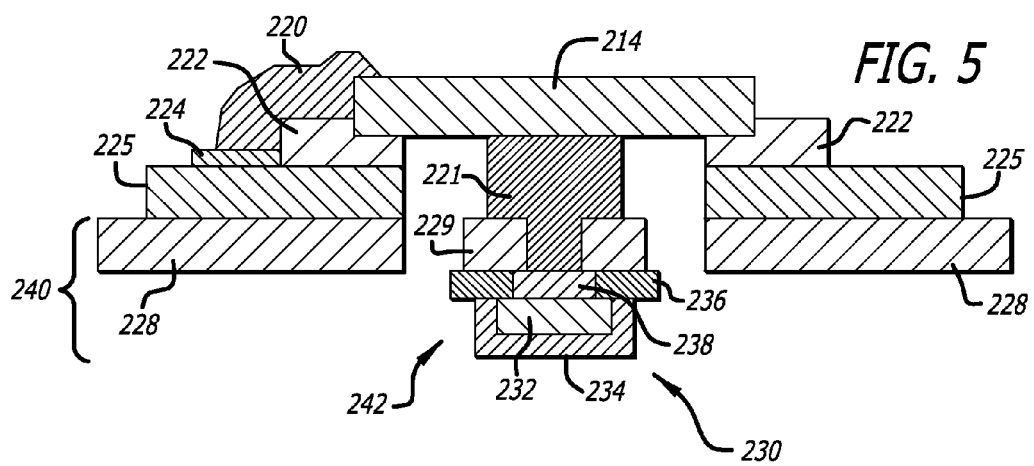
FIG. 5 is a cross section view of the suspension of FIG. 4 taken along section line A-A'.

FIG. 5 is a cross section view of the suspension of FIG. 4 taken along section line A-A' showing the details of the mechanical and electrical connections to PZT 214. PZT 214 is adhered to microactuator mounting area 225 of load beam 207 via a non-conductive adhesive 222 such as non-conductive epoxy. Typically, load beam 207 and microactuator mounting area 225 are made of stainless steel. In order to form a good quality electrical grounding bond to the stainless steel, a small patch of the stainless steel is prepared using known methods, and an electrical contact pad 224 having a conductive and non-corrosive metal such as gold is electroplated onto the stainless steel surface. The stainless steel can be prepared, and gold contact pad 224 can be plated onto the prepared stainless steel, using known methods or the methods taught in copending application Ser. No. 12/965,661 which is hereby incorporated by reference. A conductive adhesive 220 such as silver epoxy spans from the top face, which defines the ground electrode, of PZT 214, to gold bond pad 224.

Flexure circuit finger 240 carries an electrical actuation voltage to PZT microactuator 214. Typically, the electrical circuit for a suspension is defined from a laminate that includes a base layer 228 of stainless steel (SST), then an insulating layer 236 such as polyimide (Pi), then a signal conductor layer 232 comprising a conductive metal such as copper (Cu) on the polyimide, and finally an insulating coverlayer 234 such as polyimide (Pi) over copper layer 232. The flexure typically also includes various additional components such as sputtered chromium and nickel on the polyimide for better adhesion of the copper. Such constructions details, however, are commonly known and are not pertinent to the present invention, and will not be discussed further. During processing of the SST/Pi/Cu laminate to form the flexure, polyimide 236 is etched to form a window that exposes copper 232. A contact metal, preferably gold, is plated into that window to form gold contact pad 238. Gold contact pad 238 is then adhered to the drive electrode (face) of PZT 214 via conductive adhesive 221 such as conductive epoxy. Stainless steel portions 229 of the flexure may optionally be present or may have been etched away, provided that any stainless steel portions 229 are isolated via etching or the like such that they are not electrically connected to portions 228 of the flexure.

FIGS. 6 and 7 are top and bottom plan views, respectively, of the flexure 240 of the suspension of FIG. 3.

Figure 8:
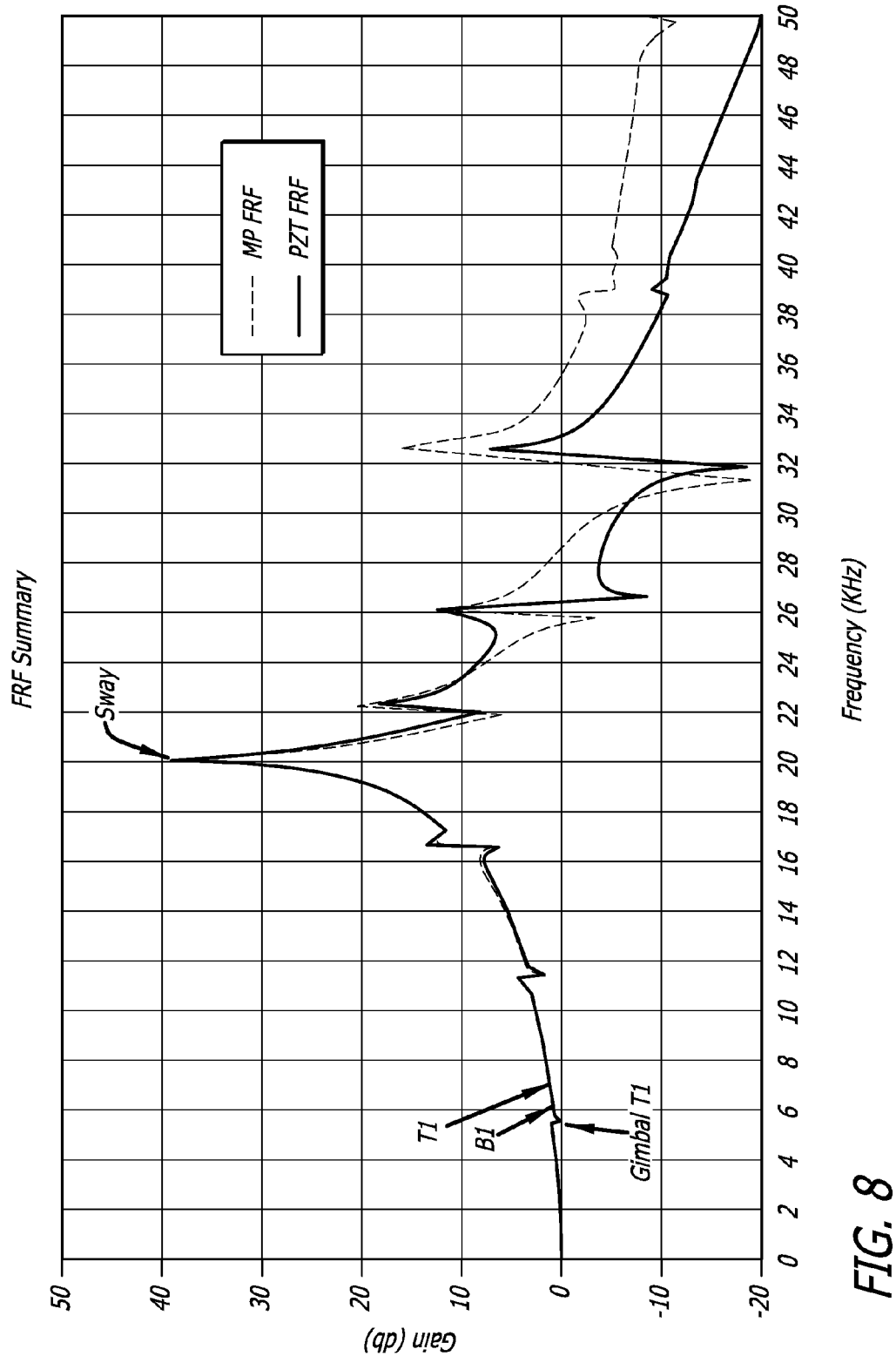
FIG. 8 is a frequency response plot for the suspension of FIG. 3.

FIG. 8 is a frequency response plot for the suspension of FIG. 3, with the following conditions applying:

| | |
|---|---|
| Stroke = | 18.3 nm/V |
| Shock = | 352 Gs/gm |
| Kp = | 0.48 μNm/deg |
| Kr = | 0.52 μNm/deg |
| Kl = | 4.2 N/mm |
| Kz = | 15.2 N/m |
| DCF = | 0.10 gm |

The dashed line represents the frequency response due to mount plate (MP) excitation, and the solid line represents the frequency response as measured due to PZT voltage excitation. As can be seen, the first bending mode ("B1") frequency occurs slightly above 6.0 kHz as desired, and the sway mode occurs around 20.0 kHz or higher as desired, which satisfies the latest DSA.

Figure 9:
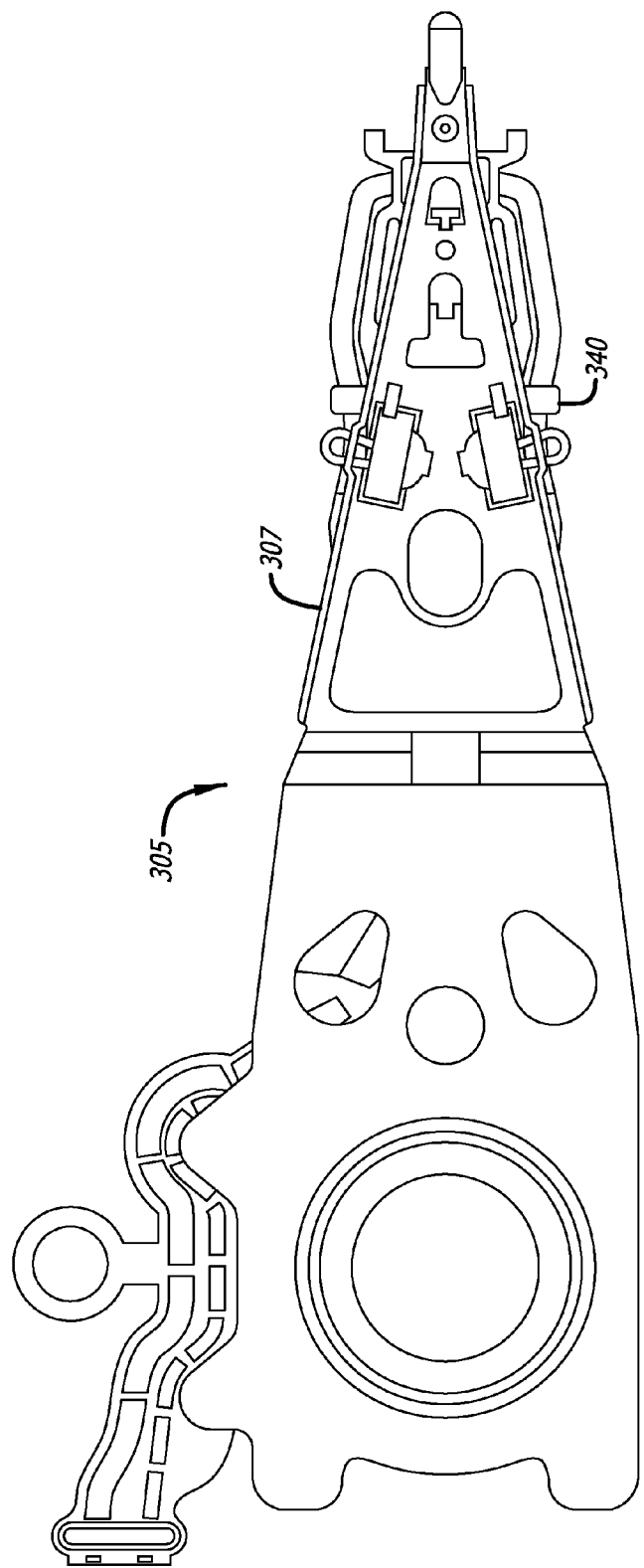
FIG. 9 is a top plan view of a suspension according to a second embodiment of the invention.

FIG. 9 is a top plan view of a suspension 305 according to a second embodiment of the invention, referred to as Design B. In this embodiment the PZT is connected through an aperture etched into the load beam to the flexure. The aperture allows the PZT to be bonded and grounded to the flexure rather than to the load beam.

Figure 10:
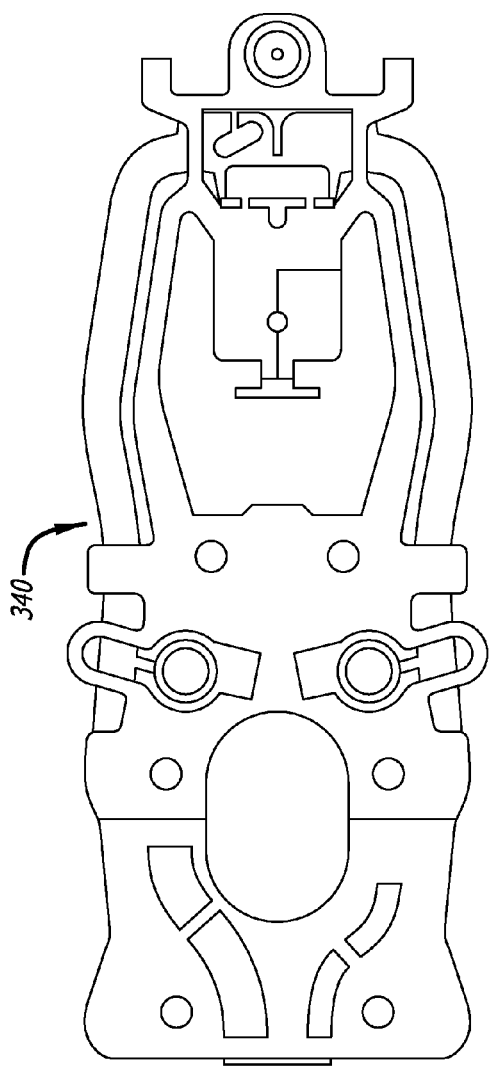
FIG. 10 is a top plan view of the flexure of the suspension of FIG. 9.

FIG. 10 is a top plan view of the flexure 340 of the suspension of FIG. 9.

Figure 11:
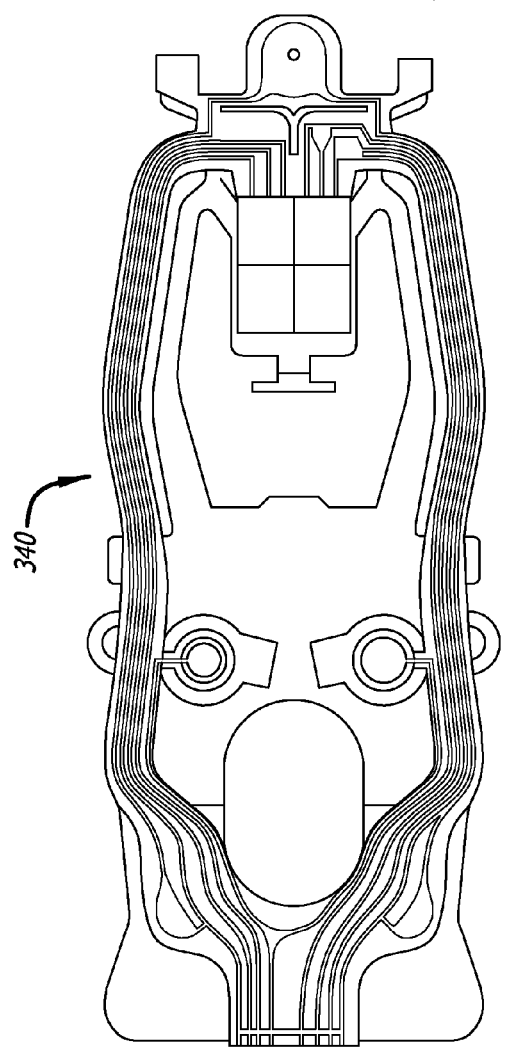
FIG. 11 is a bottom plan view of the flexure of the suspension of FIG. 9.

FIG. 11 is a bottom plan view of the flexure 340 of the suspension of FIG. 9.

Figure 12:
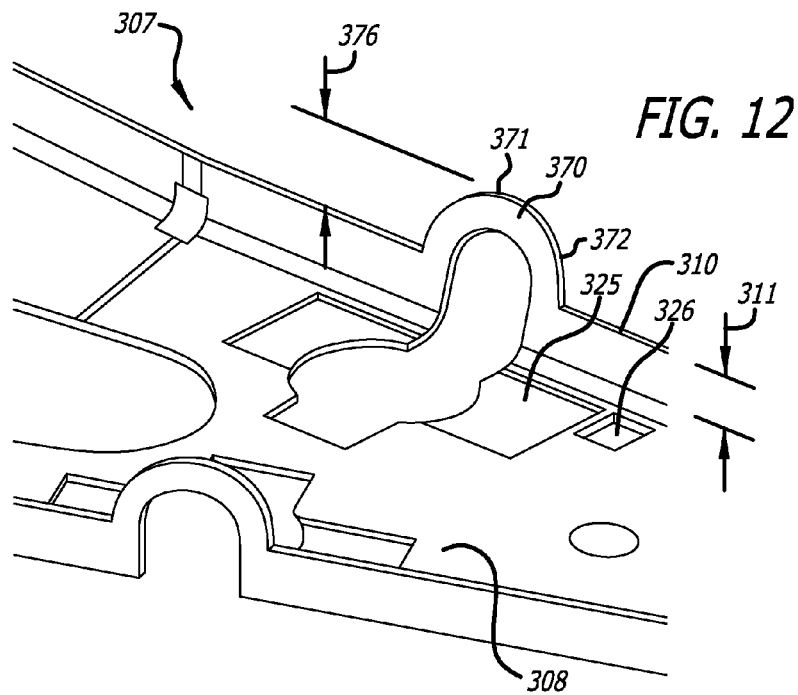
FIG. 12 is an oblique close-up view of the load beam of the suspension of FIG. 9, in the area at which the PZTs would be mounted.

FIG. 12 is an oblique close-up view of the load beam 307 of the suspension of FIG. 9, in the area at which the PZTs would be mounted. The PZTs are mounted onto mounting shelves 325 that are partially etched or otherwise formed into load beam 307. Unique to this embodiment is that apertures 326 are formed in load beam 307 such as by chemical etching, laser etching, or other method, and the PZTs are grounded through apertures 326 to the flexure.

Figure 13:
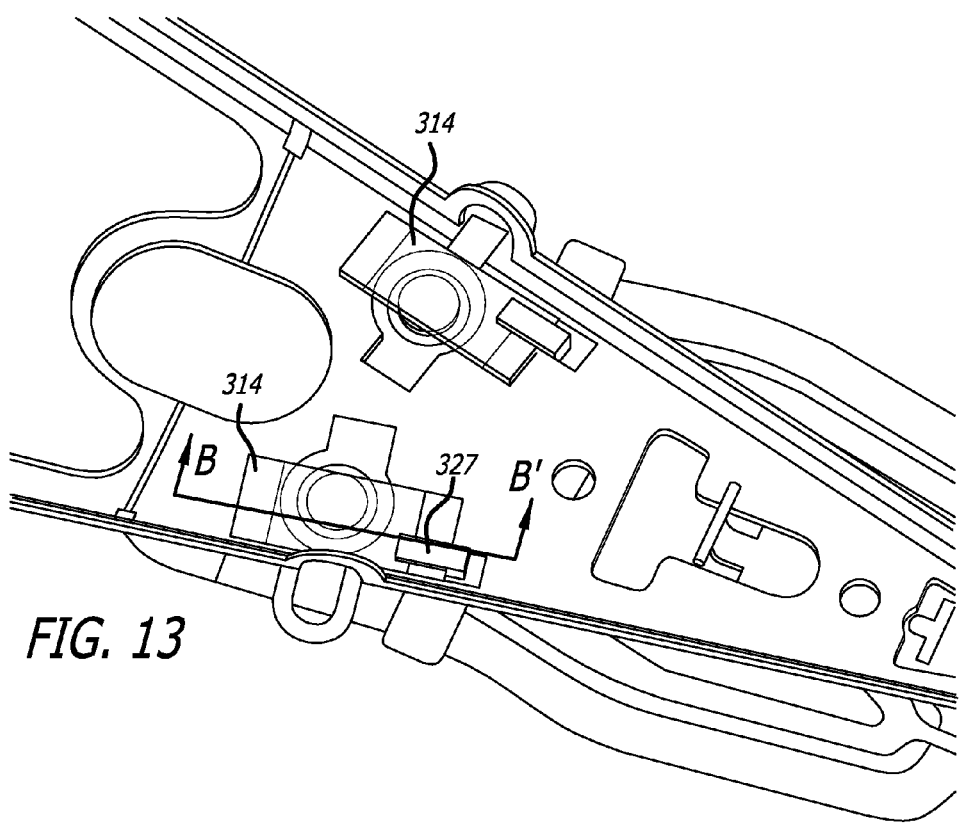
FIG. 13 is an oblique view of the suspension of FIG. 9.

FIG. 13 is an oblique view of the suspension of FIG. 9 with PZTs 314 shown in outline so that the structure underneath can be seen. Non-conductive epoxy 327 can be seen.

Figure 14:
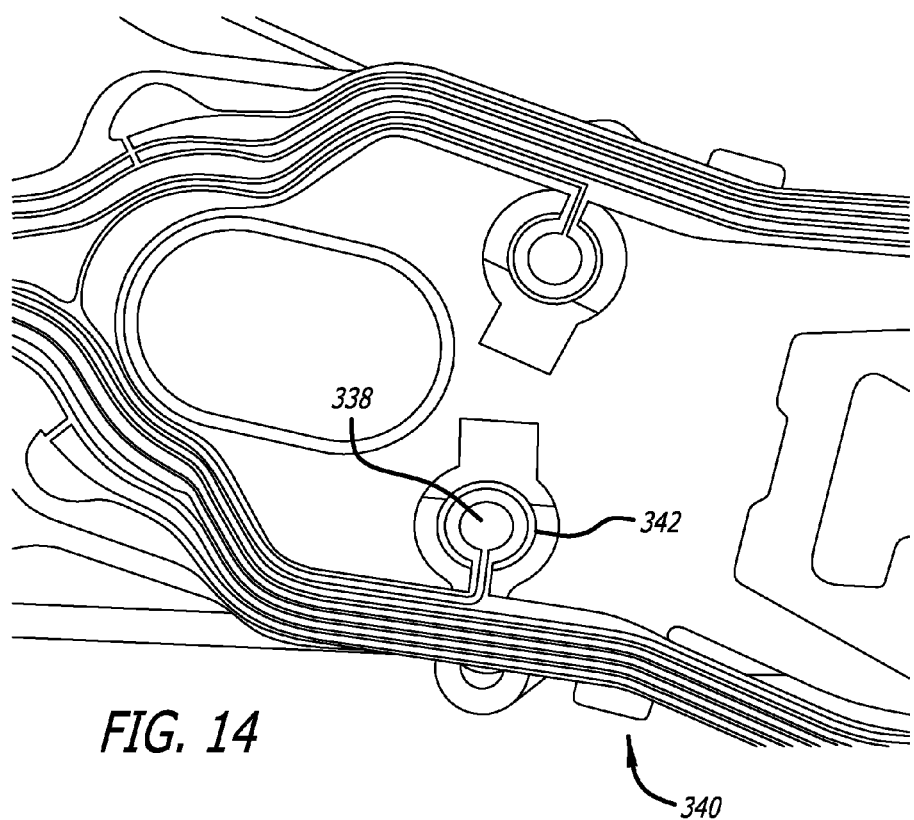
FIG. 14 is a closeup view of flexure 340 of the suspension of FIG. 9.

FIG. 14 is a closeup view of flexure 340 of the suspension of FIG. 9, showing gold bond pad 338 on flexure finger 342 through which PZT 214 is grounded.

Figure 15:
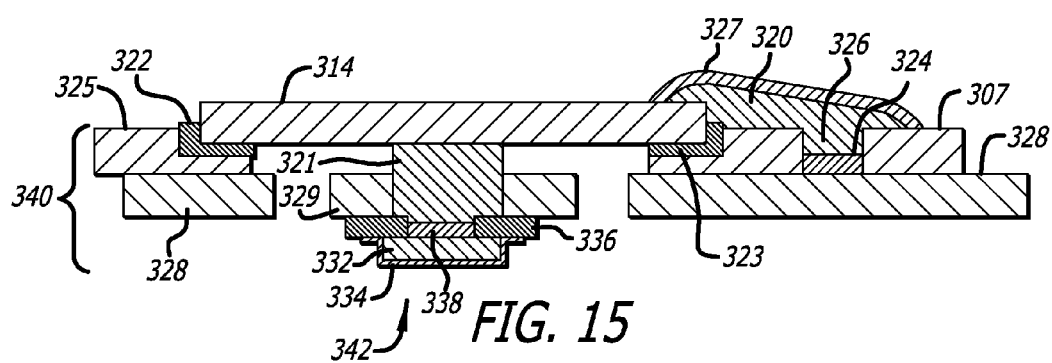
FIG. 15 is a cross section view of the suspension of FIG. 13 taken along section line B-B'.

FIG. 15 is a cross section view of the suspension of FIG. 13 taken along section line B-B' showing the details of the mechanical and electrical connections to PZT 314.

PZT 314 is adhered to microactuator shelf 325 of load beam 307 via a non-conductive adhesive 322 and 323 such as non-conductive epoxy. Flexure circuit finger 342 carries an electrical actuation voltage to PZT microactuator 314. Typically, the electrical circuit for a suspension is defined from a laminate that includes a base layer 328 of stainless steel (SST), then an insulating layer 336 such as polyimide (Pi), then a signal conductor layer 332 comprising a conductive metal such as copper (Cu) on the polyimide, and finally an insulating coverlayer 334 such as polyimide (Pi) over copper layer 332. Flexure 340 typically also includes various additional components such as sputtered chromium and nickel on the polyimide for better adhesion of the copper. Such constructions details, however, are not pertinent to the present invention and will not be discussed further. During processing of the SST/Pi/Cu laminate to form flexure 340, polyimide 336 is etched to form a window that exposes copper 332. A contact metal, preferably gold, is plated into that window to form gold contact pad 338. Gold contact pad 338 is then adhered to the drive electrode (face) of PZT 314 via conductive adhesive 321 such as conductive epoxy. Stainless steel portions 329 of flexure 340 may optionally be present or may have been etched away, provided that any stainless steel portions 329 are isolated via etching or the like such that they are not electrically connected to portions 328 of flexure 340.

The grounding connection for the PZT is formed as follows. Aperture 326 is formed within load beam 307 such as by chemical etching, allowing electrical access to the flexure stainless steel layer 328. A contact metal such as gold (Au) is plated into aperture and onto stainless steel layer 328 to form gold contact pad 324. The gold plating can be performed either before or after the flexure is welded to the load beam. Conductive epoxy 320 touches and extends between the ground face (electrode) of PZT 314 and gold contact pad 324 within aperture 326, thus forming an electrical grounding connection between the ground electrode of PZT 314 and stainless steel layer 328 of the flexure. The flexure is typically welded to the load beam, thus establishing electrical continuity therebetween. Optionally, a final layer 327 of non-conductive epoxy coats and covers conductive epoxy 320.

Figure 16:
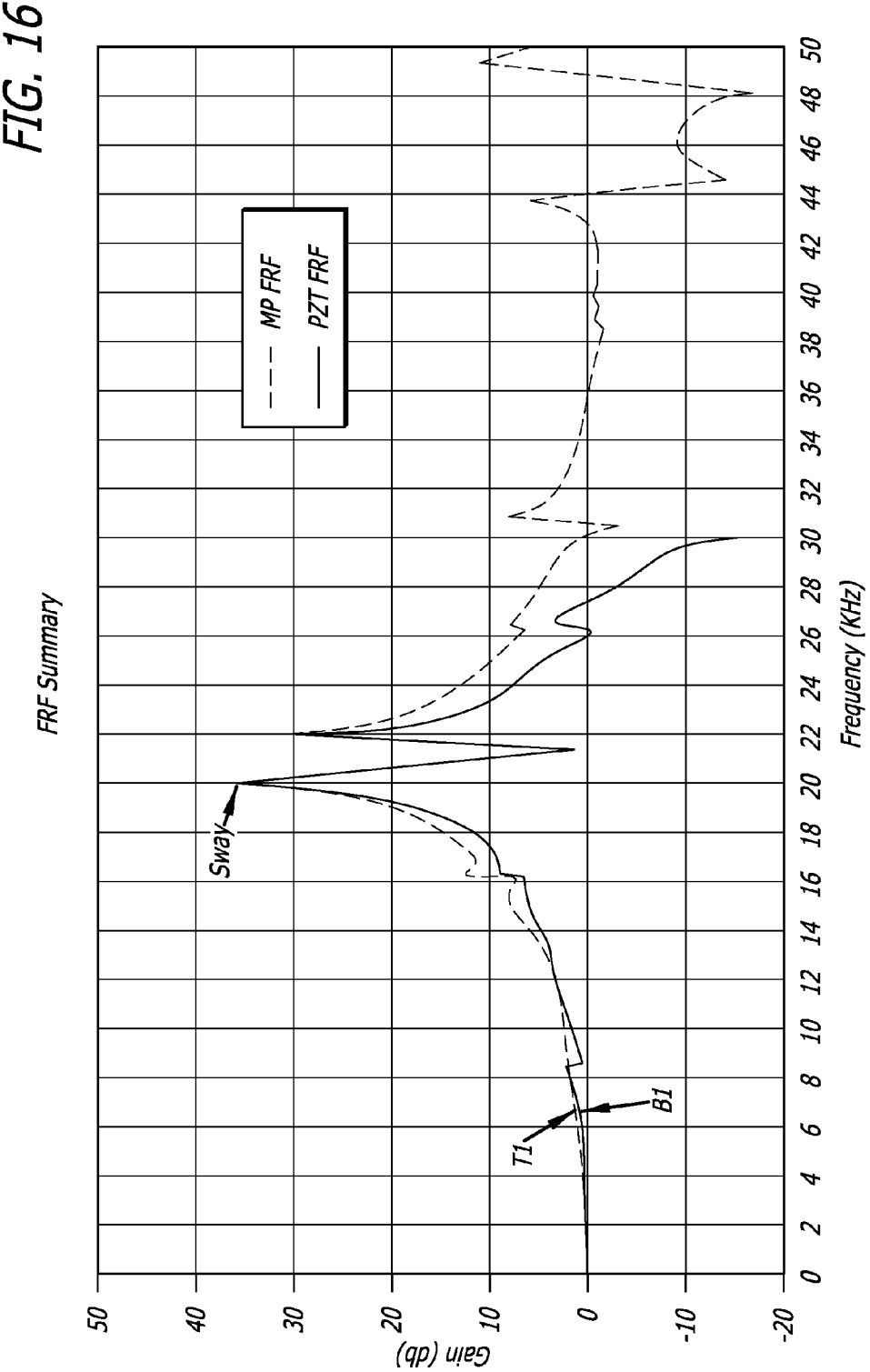
FIG. 16 is a frequency response plot for the suspension of FIG. 13.

FIG. 16 is a frequency response plot for the suspension of FIG. 13. As can be seen, the first bending mode ("B1") frequency occurs slightly above 6.0 kHz as desired, and the sway mode occurs around 20.0 kHz or higher as desired, which satisfies the latest DSA design requirements.

Figure 17:
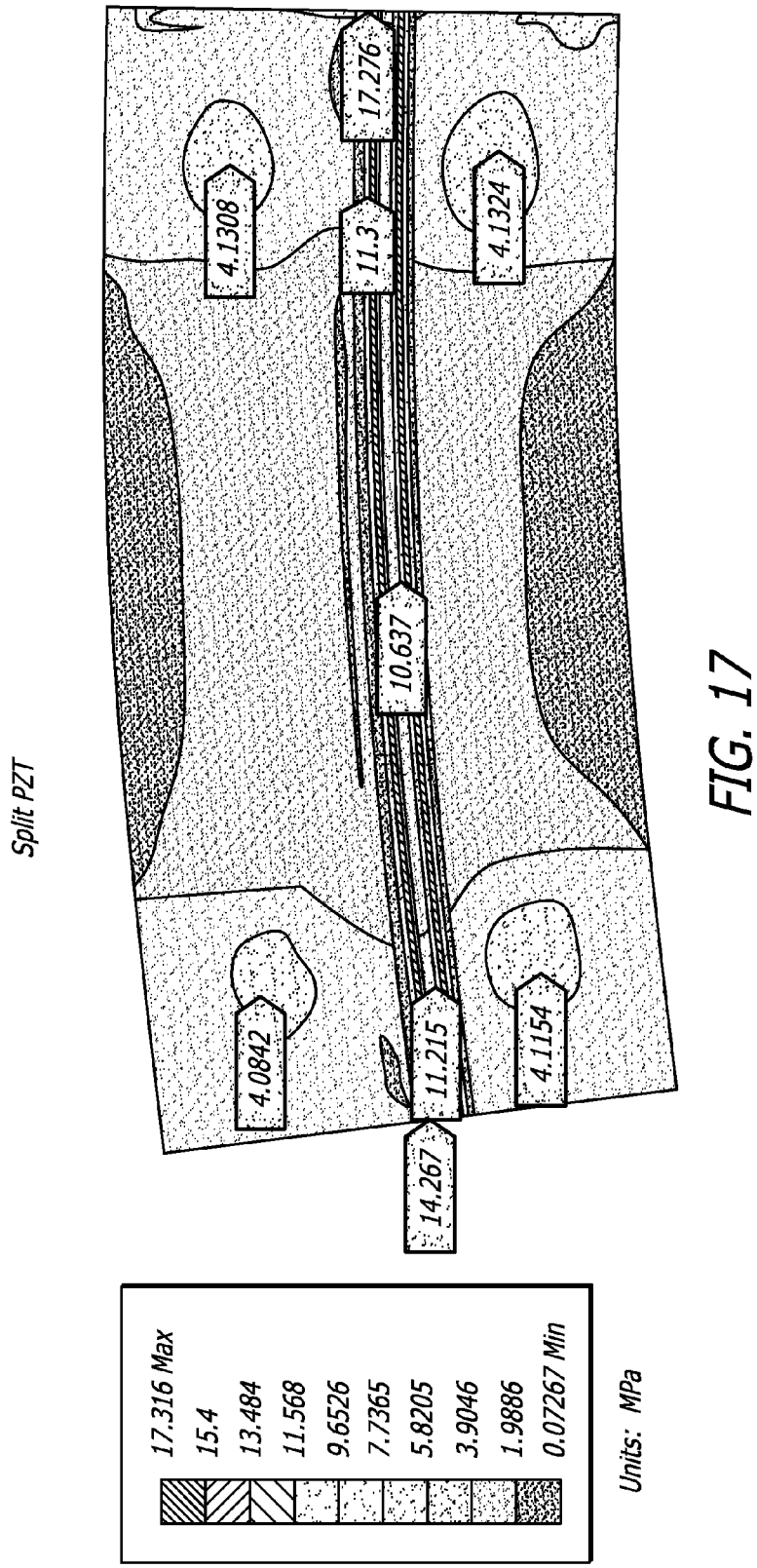
FIG. 17 is a plot of stress on the suspension underneath the PZT for a suspension similar to that of FIG. 9 but with a single split PZT in the transverse middle of the load beam.

FIG. 17 is a stress plot of the PZT on the suspension similar to FIG. 9 but with a single split PZT in the transverse middle of the load beam. The data is taken from a simulation according to a finite element analysis model, with the stress being equivalent (von-Mises) stress in MPa. Note the relatively high stresses near the transverse middle in the neighborhood of approximately 10-11 MPa, with a maximum recorded stress of 17.316 MPa.

Figure 18:
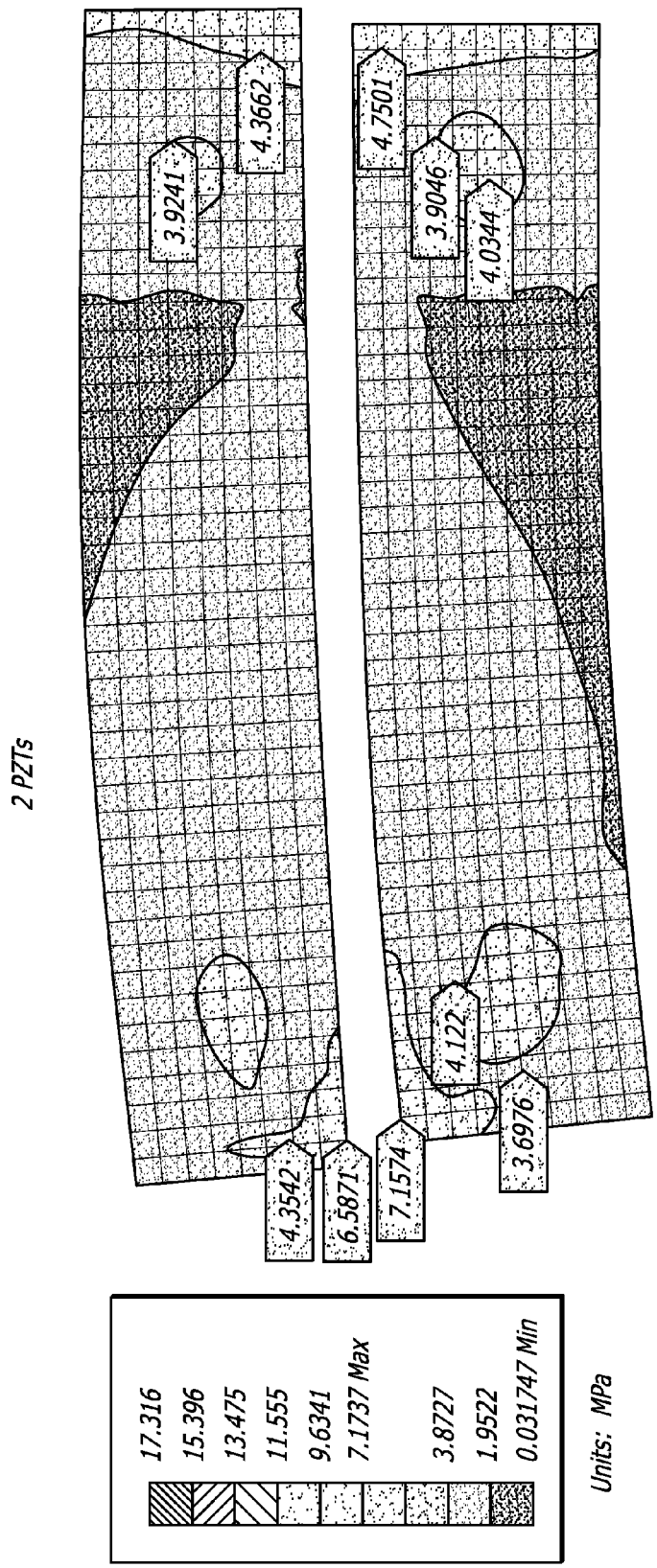
FIG. 18 is a plot of stress on the suspension underneath two non-split PZTs positioned near the side rails as shown in FIG. 9.

FIG. 18 is a stress plat of the two non-split PZTs positioned near the side rails as shown in FIG. 9. The data is taken from a simulation according to a finite element analysis model, with the stress being equivalent (von-Mises) stress in MPa. Note the relatively low stresses compared to those of FIG. 18 for the single split PZT at the middle of the load beam, with a maximum recorded stress of 7.137 MPa. Due to the brittle nature of the PZT material, minimizing the stress across the PZT body significantly helps to reduce PZT cracking PZT cracking would not only prevent the normal functioning of the microactuators and thus decrease head positioning servo loop performance, but would also generate hard PZT particles that could cause fatal damage to the data disk. It is therefore highly advantageous to reduce stress on the PZT microactuators.

Referring again to FIG. 12, in another aspect of the invention, the suspension has a vertically extending spring near the PZTs rather than other configurations that have been used. As used herein, the phrase "vertically extending" means that the ring extends more vertically than horizontally, i.e., the vertical component is greater than the horizontal component. Ring 370 forms an angle with respect to the major plane 308 that is at least 45°. Vertically extending ring or spring 370 consists of a vertically extending ring defined by vertically extending arch 372, or other convexly curved portion extending upwardly, located laterally adjacent the spring's associated PZT 314. Ring 370 has a height 376 as measured from the top 371 of ring 370 to the top of load beam rail 310. Spring 370 allows the PZTs to expand and contract in response to actuation of its adjacent PZT, and thus allows the PZT to move the head slider radially over the data disk to the desired location. That is, spring 370 acts as a PZT relief feature. Forming the PZT relief as a vertically extending spring rather than as in prior art eliminates the need to stamp or otherwise form the bends in the PZT relief features, as was required by various prior art DSA suspensions. In the embodiment shown, spring 370 takes the form of a vertically extending C-spring. The top 371 of C-spring 370 extends above the top of rail 310. In the embodiment shows, the top 317 of C-spring 370 extends above the top of rail 310 by a distance that is at least 25% of a nominal height 311 of stiffening rail 310, and more particularly at least 50% of nominal height 311. As used herein, the term "nominal height" means the height of rail 310 not including C-spring 370.

Figure 19:
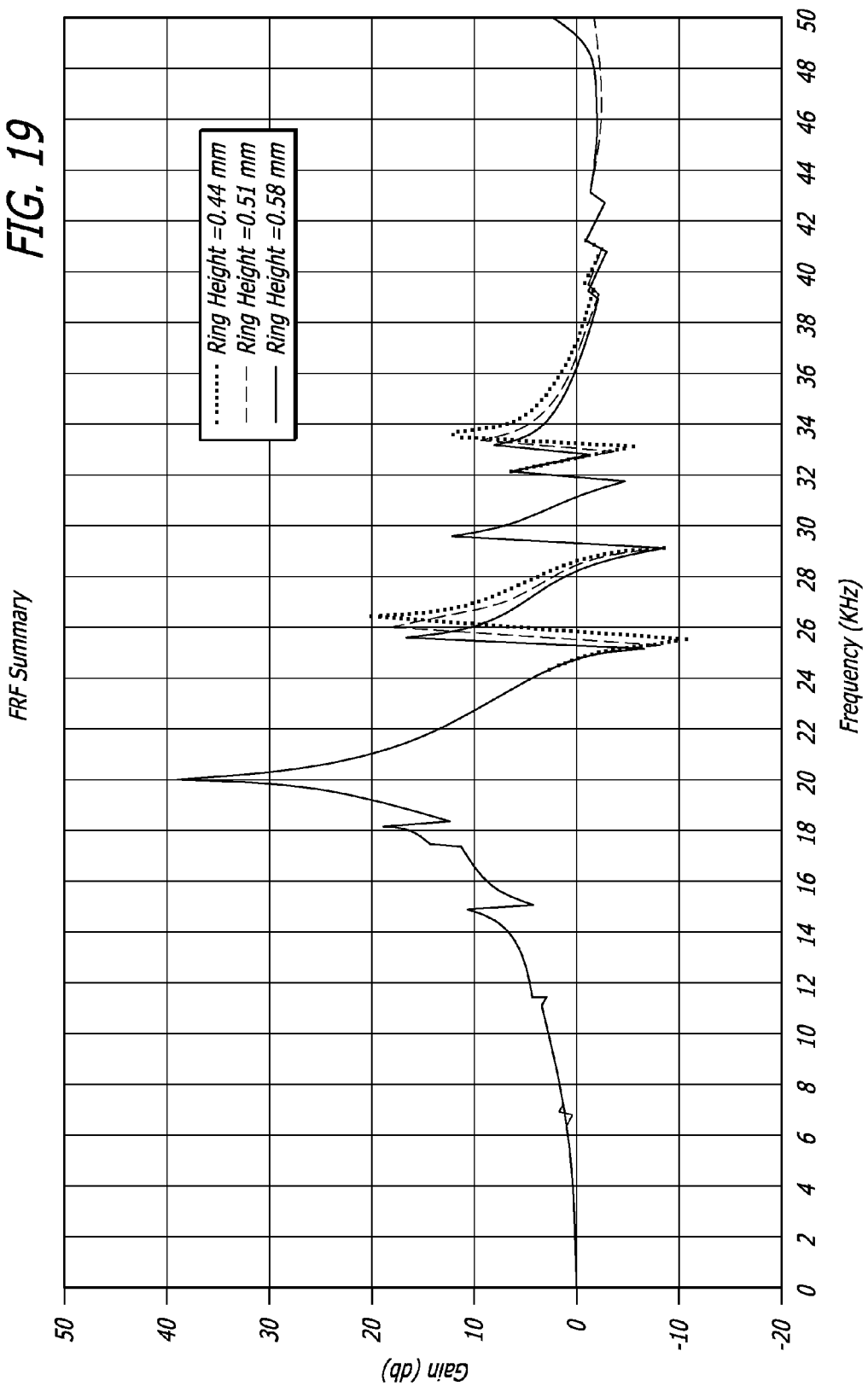
FIG. 19 is a frequency response plot of the suspension of FIG. 9 for three different ring heights, according to simulations.

FIG. 19 is a frequency response plot of the suspension of FIG. 9 for three different ring heights, according to simulations. The maximum ring height in the Z-direction is constrained by the maximum allowable suspension height, which is limited by the distance between data disks in the HAS.

The stroke and shock data for those simulations is:

TABLE 1

| Ring Width (mm) | Ring Height (mm) | Stroke (nm/V) | Shock (Gs/gm) |
|---|---|---|---|
| 0.30 | 0.44 | 19.6 | 352 |
| | 0.51 | 20.6 | 352 |
| | 0.58 | 21.3 | 325 |

As can be seen from the table, stoke length, which is the measure of distance of linear PZT movement per volt of input voltage applied across the PZT, increased with increasing ring height.

Figure 20:
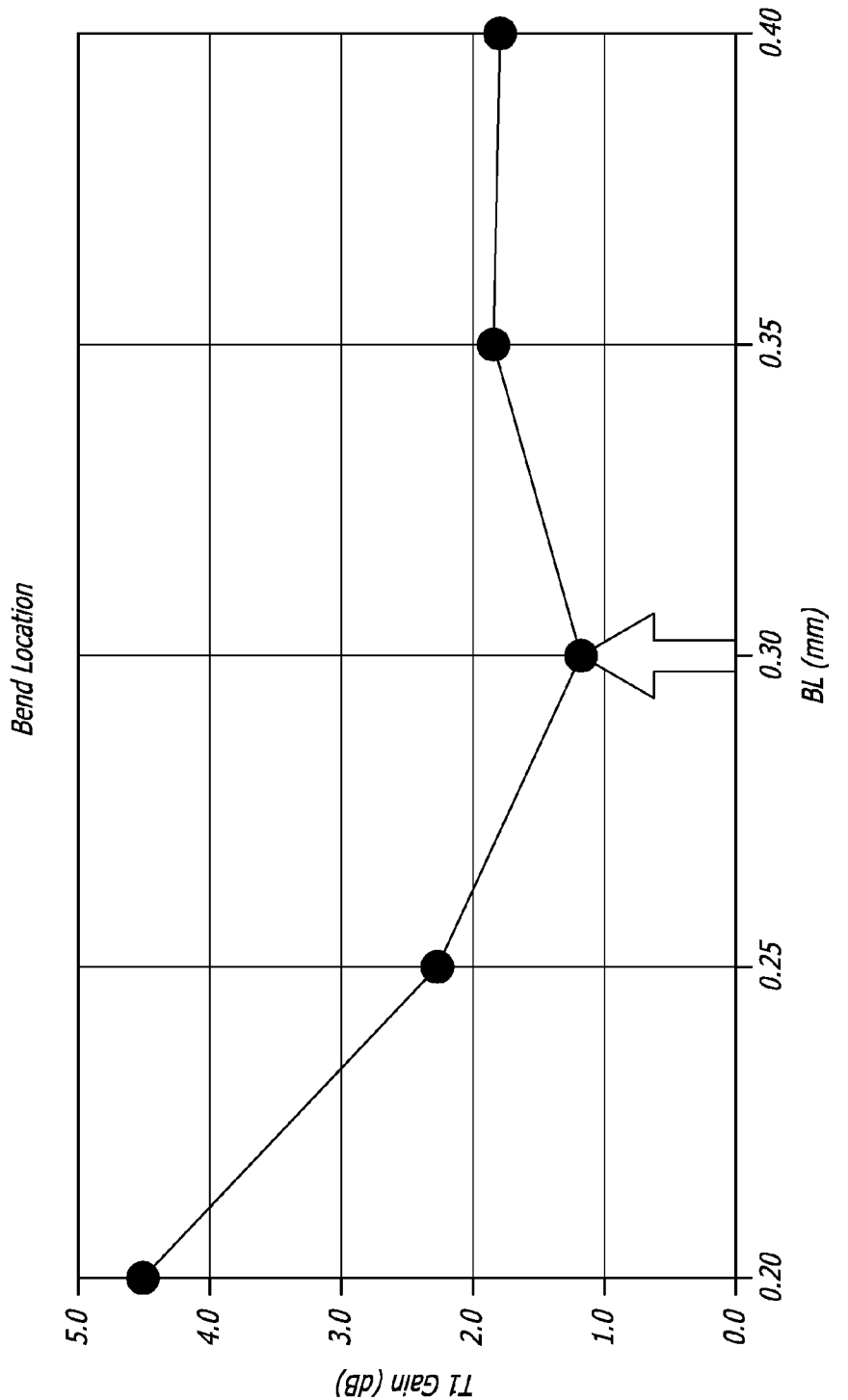
FIG. 20 is a graph of the T1 gain of suspension 305 as a function of pre-gram bend location.

FIG. 20 is a graph of the T1 gain of suspension 305 as a function of the location of the pre-gram bend, as measured from the edge of the mount plate. It is desirable to minimize the T1 gain. As can be seen from the graph, the T1 gain has minima within the region of about 0.25-0.35 mm, and more specifically at about 0.30 mm.

It can be seen from the graph and the table therefore that increasing the height of the ring leads to a higher stroke and less FRF effect. The ring height is therefore preferably within the range of about 0.30-0.60 mm, and more preferably within the range of about 0.50-0.60 mm.

Figure 21:
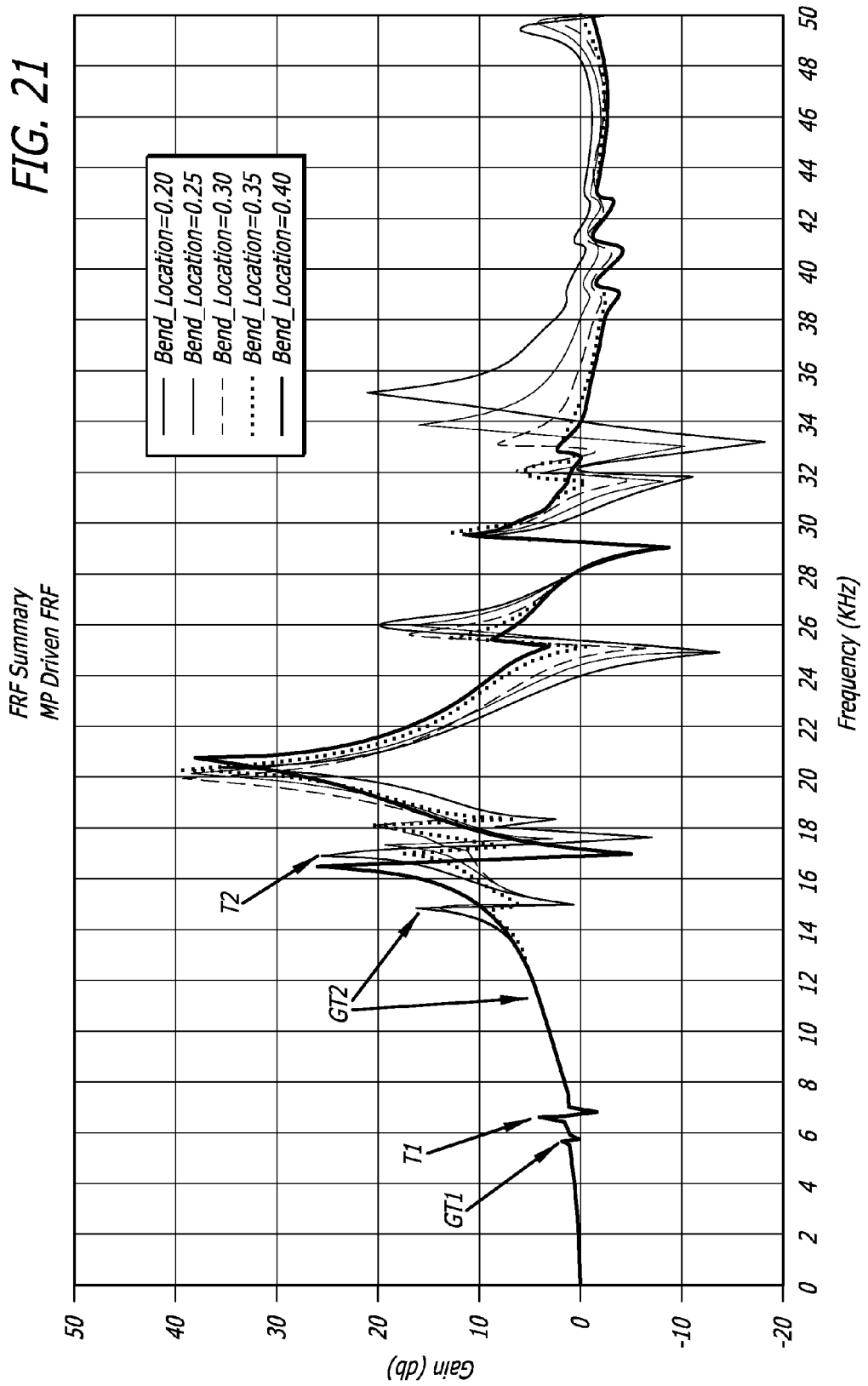
FIG. 21 is a graph of the frequency response of the suspension of FIG. 9 according to simulations, for various pre-gram bend locations.

FIG. 21 is a graph of the frequency response of the suspension of FIG. 9 for input at the mount plate, according to simulations run, for various bend locations. The bend location of 0.30 mm produced substantially lower GT1, T1, GT2, and T2 gains. The pre-gram bend locations of 0.25-0.35 mm also produced good results. The pre-gram bend location is therefore preferably with the range of about 0.25-0.35 mm, and more preferably at about 0.30 mm.

Figure 22:
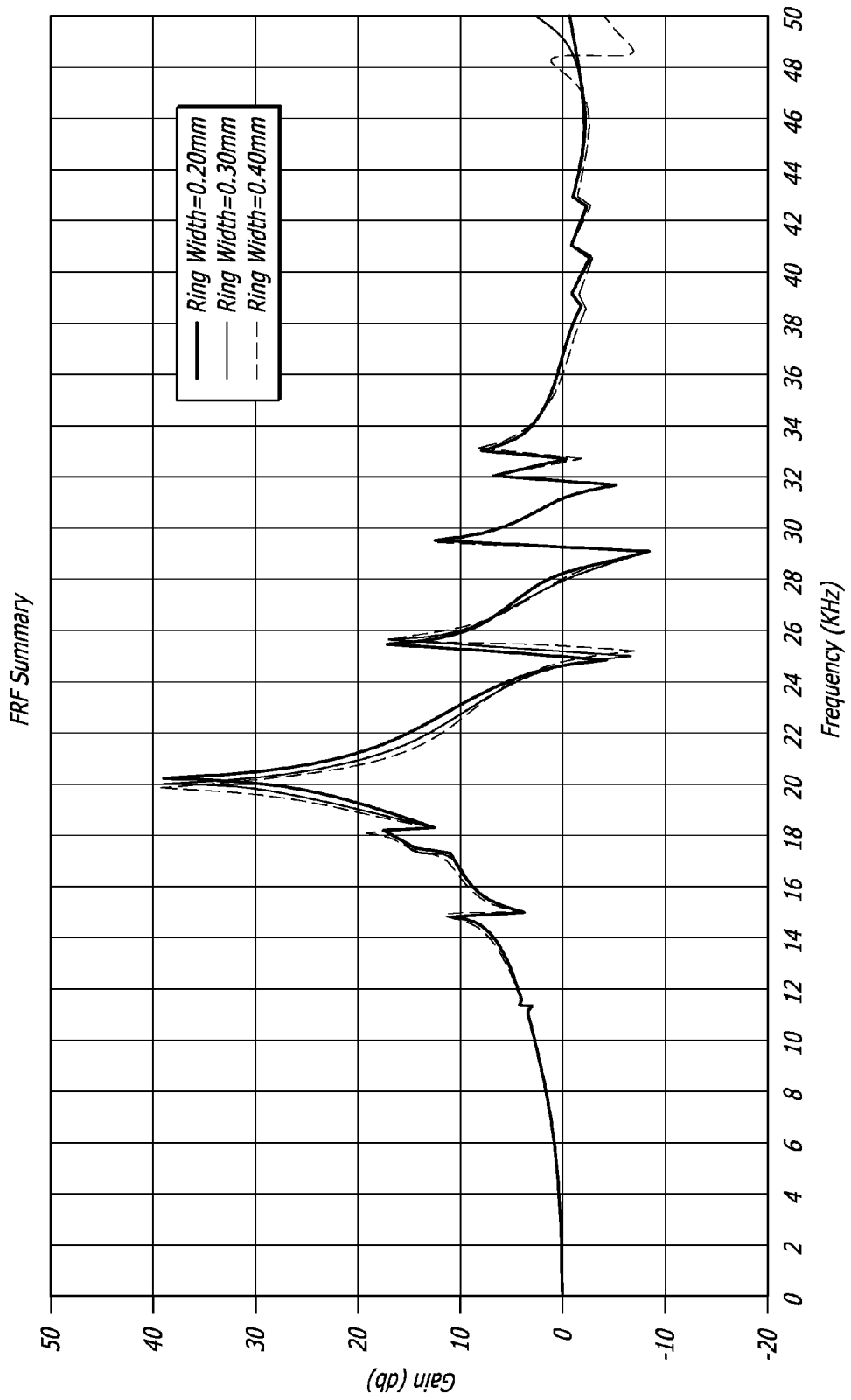
FIG. 22 is a graph of the frequency response of the suspension of FIG. 9 for different ring widths according to simulations.

FIG. 22 is a graph of the frequency response of the suspension of FIG. 9 for different ring widths $W_R$ according to simulations, where $W_R$ is the width of the openings in load beam 307 underneath the PZTs (FIG. 12). The stroke and shock data for those simulations is:

| Ring Height (mm) | Ring Width (mm) | Stroke (nm/V) | Shock (Gs/gm) |
|---|---|---|---|
| 0.58 | 0.20 | 20.9 | 349 |
| | 0.30 | 21.3 | 352 |
| | 0.40 | 21.6 | 324 |

It can be seen from the graph and the table therefore that increasing the width of the ring leads to a higher stroke and less FRF effect. The ring width is therefore preferably within the range of about 0.30-0.50 mm, and more preferably within the range of about 0.40-0.50 mm, and most preferably about 0.40 mm.

Figure 23:
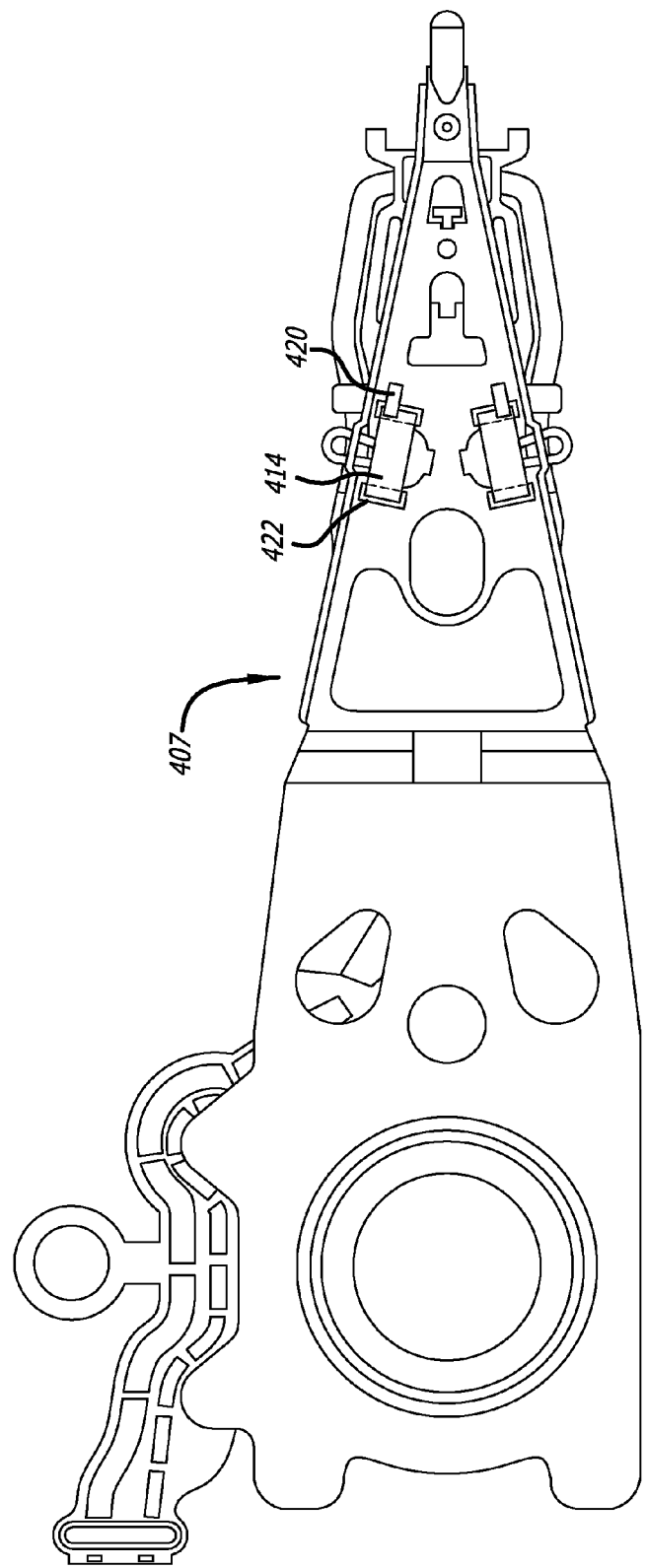
FIG. 23 is top plan view of a suspension according to a third embodiment of the invention.

FIG. 23 is top plan view of a suspension according to a third embodiment of the invention, referred to as Design C. In this embodiment the PZT is bonded and grounded onto the flexure. There is no shelf formed into the load beam onto which the PZT is bonded using epoxy, as there is with Design B of FIG. 15. Instead, the PZT is bonded onto SST portion 428 of flexure 440 using non-conductive epoxy 422 and 423, as seen more clearly in FIG. 29.

FIG. 24 is a top plan view of the flexure of the suspension of FIG. 23.

FIG. 25 is a bottom plan view of the flexure of the suspension of FIG. 23.

Figure 26:
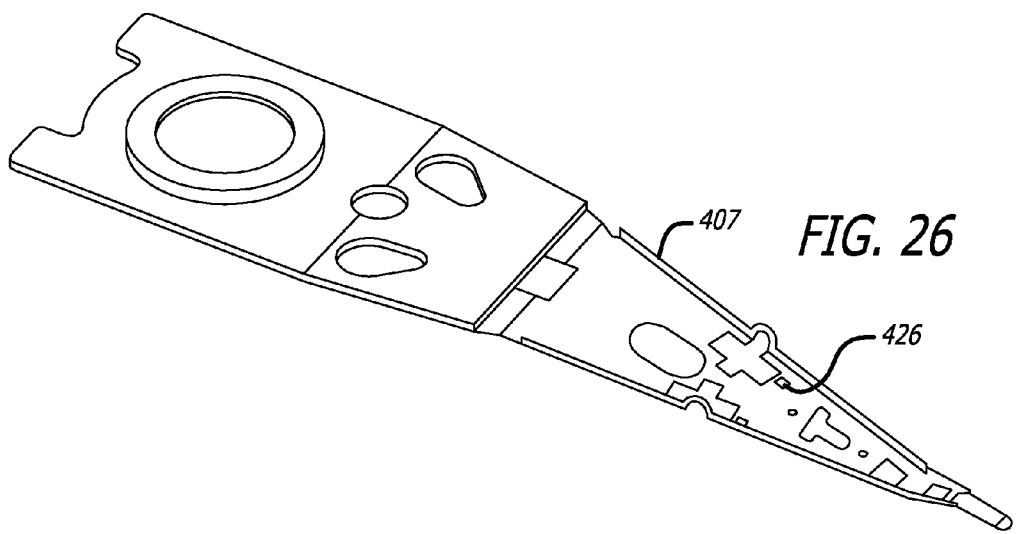
FIG. 26 is a top plan view of the suspension of FIG. 23, but without the flexure.

FIG. 26 is a top plan view of the suspension of FIG. 23, but without flexure 440.

Figure 27:
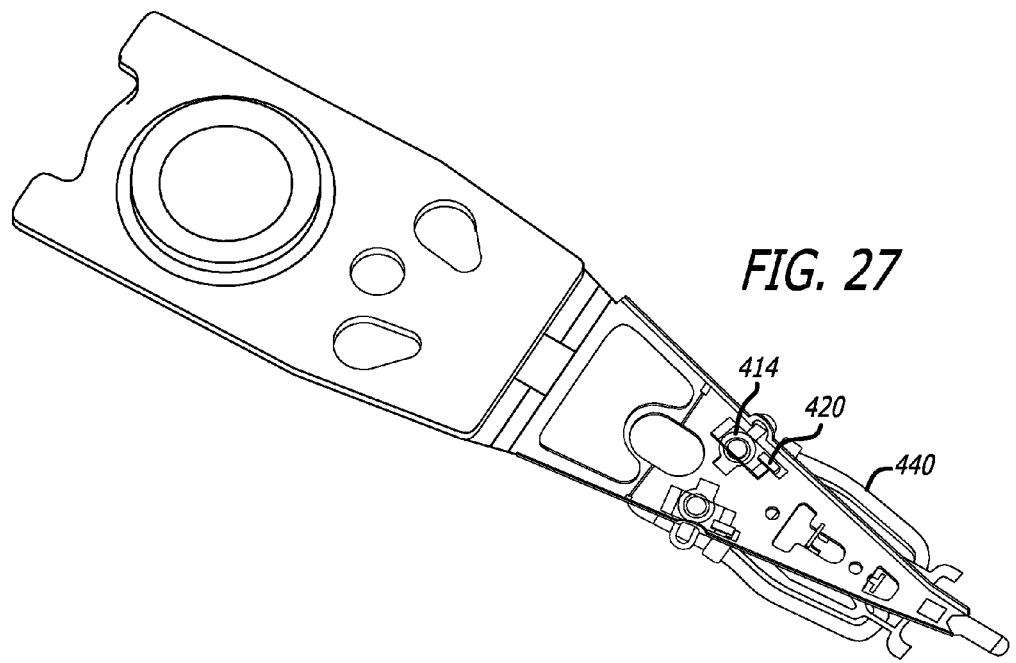
FIG. 27 is an oblique view of the suspension of FIG. 23.

FIG. 27 is an oblique view of the suspension of FIG. 23, with PZTs 414 shown in outline to reveal some of the structure below.

FIG. 28 is an oblique close-up view of the load beam of the suspension of FIG. 23, with PZTs 414 shown in outline.

FIG. 29 is a cross section view of the suspension of FIG. 28 taken along section line C-C' showing the details of the mechanical and electrical connections to PZT 414. PZTs 414 are mounted to stainless steel portions 428 of flexure 440 via non-conductive epoxy 422 and non-conductive epoxy 423. The ground connection to PZT 414 is made via conductive epoxy 420 through aperture 426 in load beam 407 to a gold-plated contact pad 424 formed on stainless steel portion 428 of flexure 440 below. The driving voltage connection to PZT 414 is made from copper alloy signal conductor 432 of finger 442 of flexure 440 using conductive epoxy 421. Signal conductor 432 is coated with gold to form gold contact pad 428. Flexure finger further 442 includes stainless steel portion 429, an insulating layer 436 such as polyimide, and insulating cover layer 434 such as polyimide.

The grounding connection for the PZT is formed as follows. Aperture 426 is formed within load beam 407, allowing electrical access to the flexure stainless steel layer 428. A contact metal such as gold (Au) is plated into aperture and onto stainless steel layer 428 to form gold contact pad 424. Conductive epoxy 420 touches and extends between the ground face (electrode) of PZT 414 and gold contact pad 424 within aperture 426, thus forming an electrical grounding connection between the ground electrode of PZT 414 and stainless steel layer 428 of flexure 440. Flexure 440 is typically welded to, and grounded through, load beam 407. Optionally, a final layer of non-conductive epoxy coats and covers conductive epoxy 420.

Figure 30:
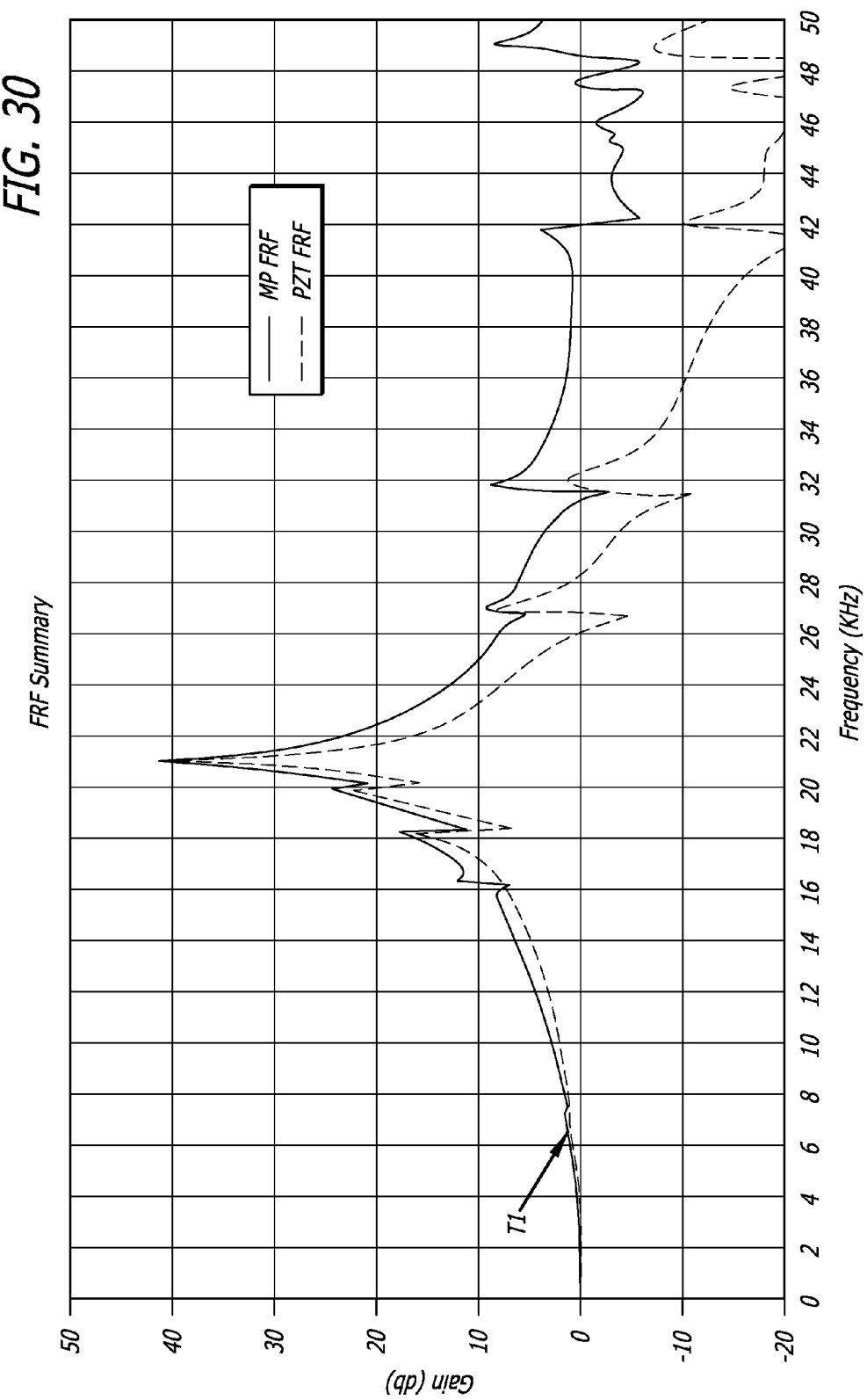
FIG. 30 is a graph of the frequency response of the suspension of FIG. 23.

FIG. 30 is a graph of the frequency response of the suspension of FIG. 23 with the following conditions applying:

| | |
|---|---|
| Stroke = | 14.8 nm/V |
| Kp = | 0.47 μNm/deg |
| Kr = | 0.67 μNm/deg |
| T1 = | 6.1 kHz |
| Sway = | 21.0 kHz |

The solid line represents the frequency response due to mount plate (MP) excitation, and the dashed line represents the frequency response as measured due to PZT voltage excitation. From this FRF response plot, it can be seen that the current invention can well meet the DSA design requirements, such as clean FRF, first bending mode, first torsion mode and sway mode in the reasonable range.

FIGS. 31-37 are various illustrations of an additional embodiment of the invention, referred to as Design D, in which the ground connection for the PZT is made through apertures in the load beam and the flexure, and to a contact pad of the flexible circuit trace. Because the conductive epoxy that forms part of the ground path from the PZT contacts the stainless steel of both the load beam and the flexure, and also contacts an electrical contact pad of the flexible circuit, the embodiment provides multiple paths to ground and hence more efficient grounding. Additionally, grounding in this embodiment is accomplished through a gold pad on copper, which his generally easier to manufacture than a gold pad on stainless steel, and more effective than through conductive epoxy on bare stainless steel.

Figure 31:
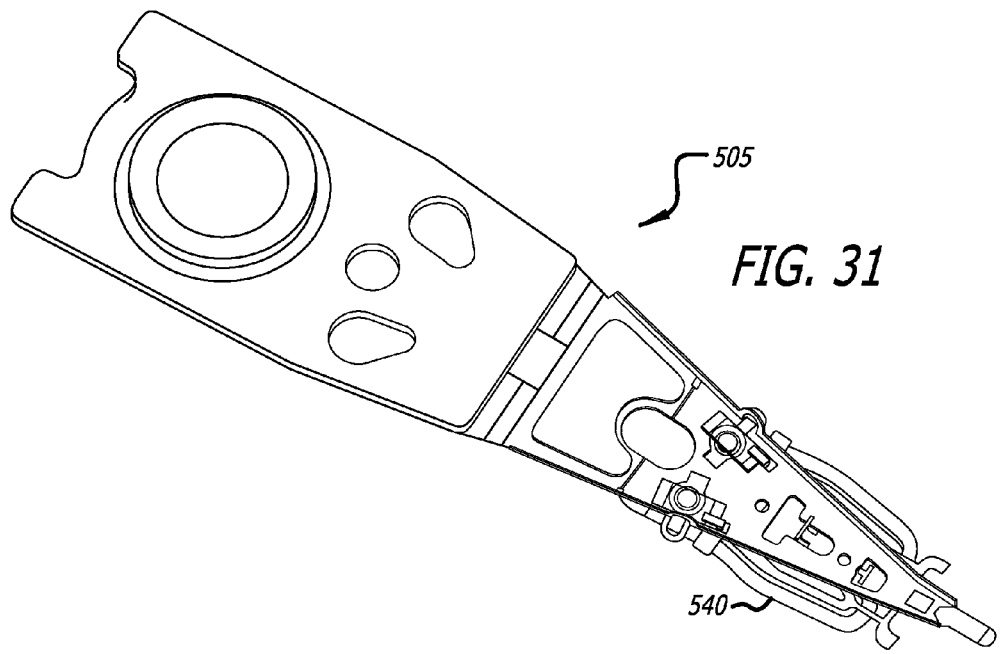
FIG. 31 is oblique view of a fourth embodiment of the invention.

FIG. 31 is an oblique view of the completed suspension 505 of this embodiment.

Figure 32:
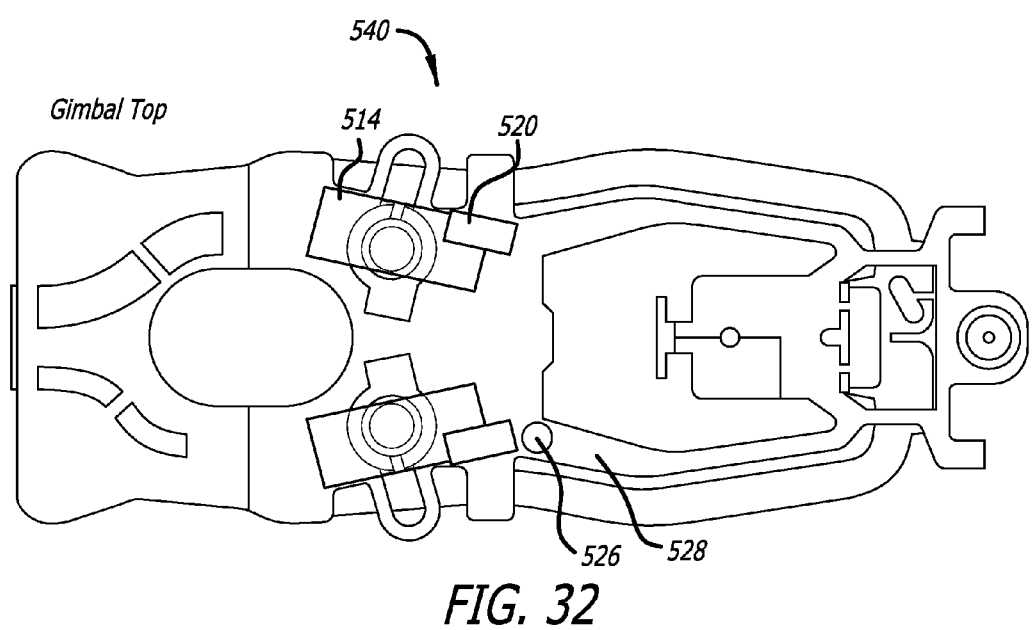
FIG. 32 is a top plan view of the flexure of the suspension of FIG. 31.

FIG. 32 is a top plan view (i.e., from what is called the gimbal top) of the flexure of the suspension of FIG. 31, showing two PZTs 514 but showing only the bridge of conductive epoxy 520 for one PZT 514 on one side, so as to disclose aperture 526 through stainless steel portion 528 of flexure 540 on the other side.

Figure 33:
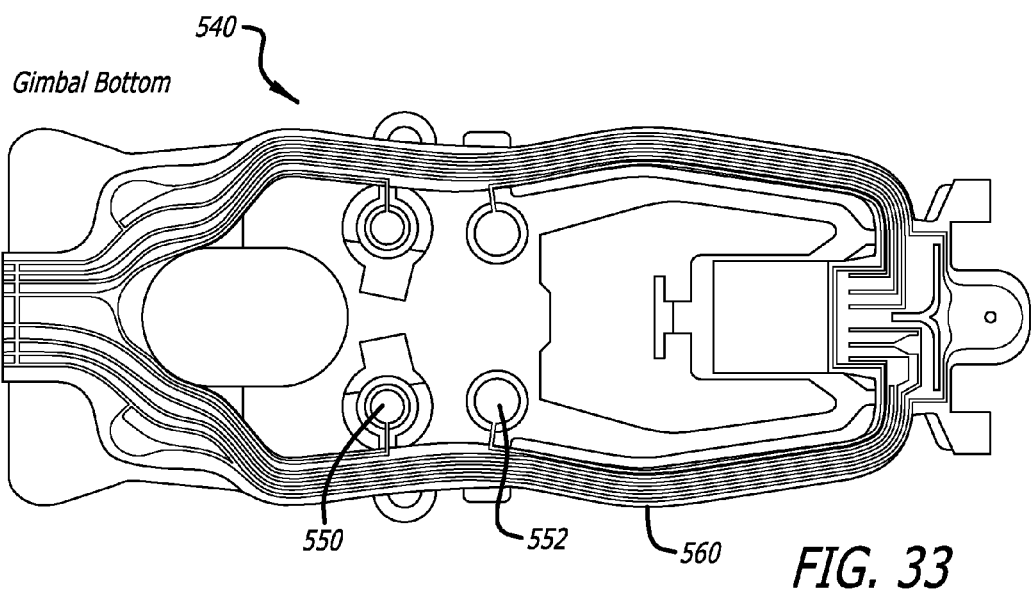
FIG. 33 is a bottom plan view of the flexure of the suspension of FIG. 31.

FIG. 33 is a bottom plan view (i.e., from what is called the gimbal bottom) of the flexure of the suspension of FIG. 31, showing flexible circuit 560 and electrical contact pads 550 and 552 thereof. Electrical contact pad 550 provides the driving (+) voltage for PZT 514, and electrical contact pad 552 provides the ground (Gnd) path for PZT 514.

Figure 34:
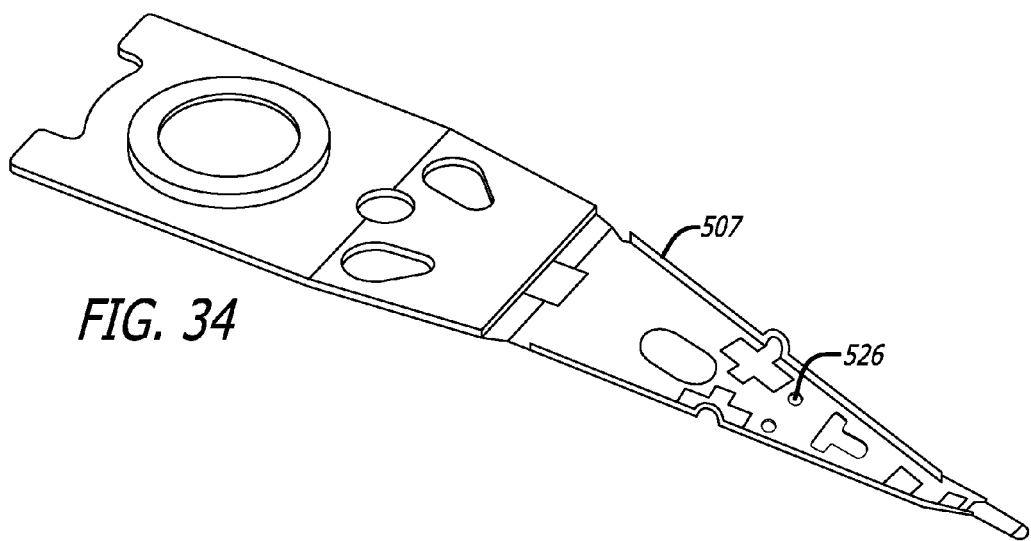
FIG. 34 is an oblique view of the load beam of the suspension of FIG. 31 but without flexure 540.

FIG. 34 is an oblique view of the load beam 507 of the suspension 505 of FIG. 31 but without flexure 540. Apertures 526 through load beam 507 are visible.

Figure 35:
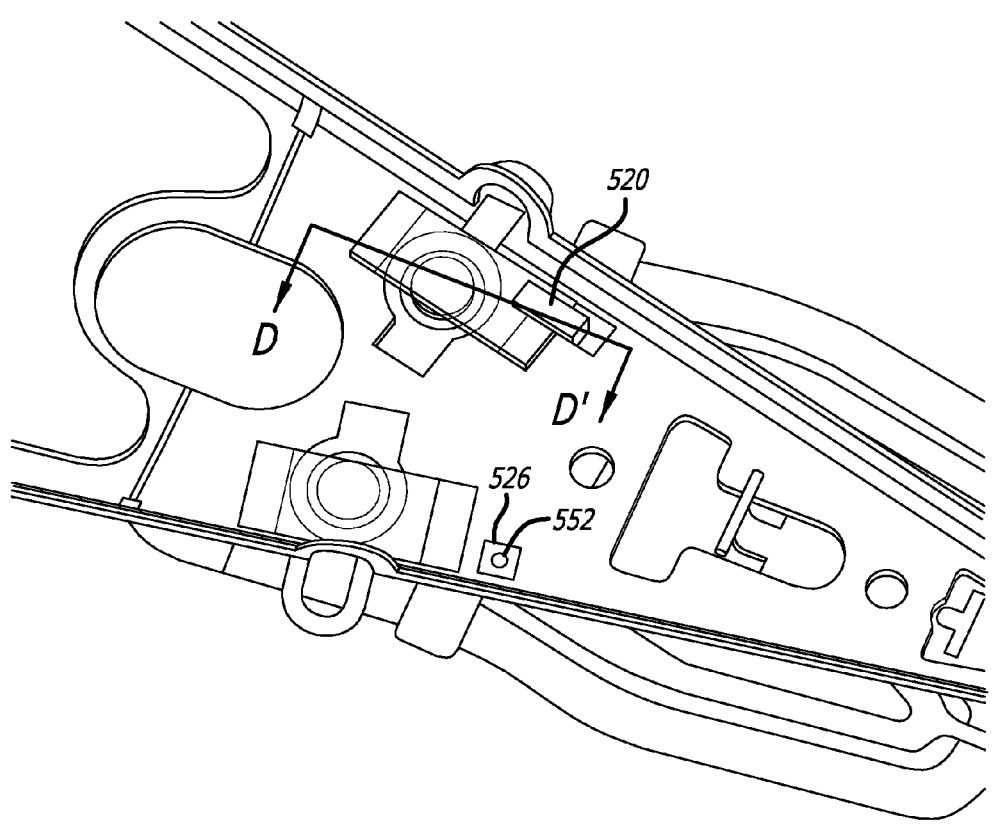
FIG. 35 is an oblique closeup view of the suspension of FIG. 31 but with one of the bridges of conductive epoxy removed for clarity of illustration.

FIG. 35 is an oblique closeup view of the suspension of FIG. 31 but with one of the bridges of conductive epoxy 520 removed to reveal aperture 526 through load beam 507, and revealing electrical contact pad 552 of flexible circuit 560.

Figure 36:
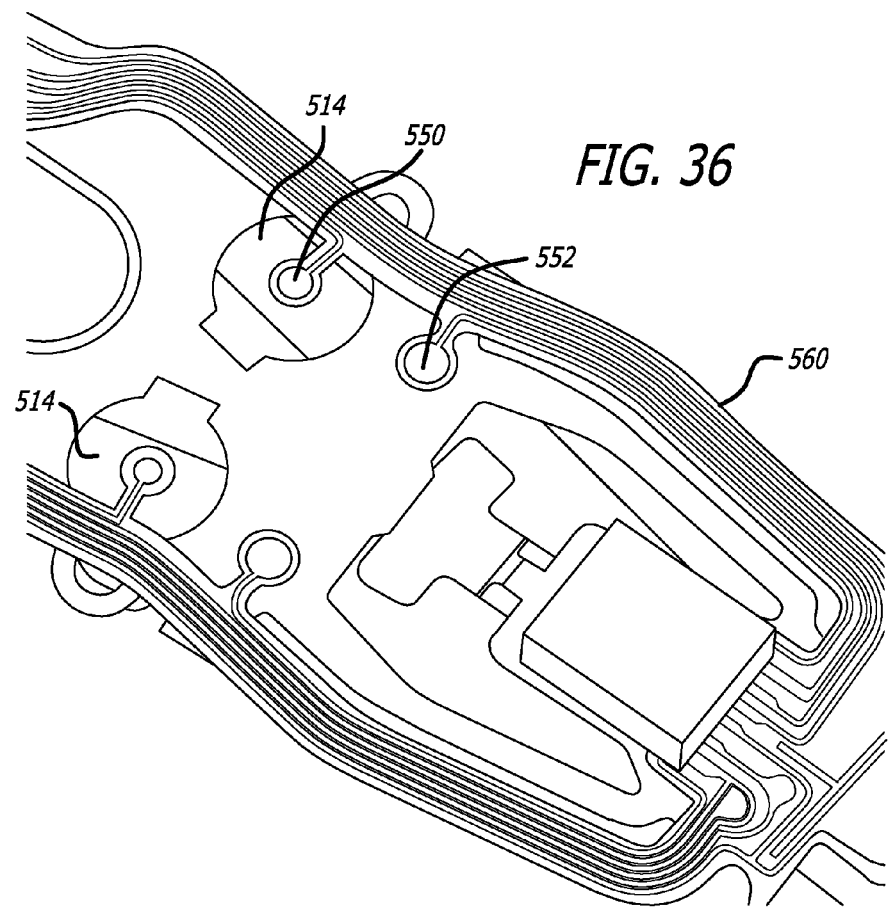
FIG. 36 is an oblique view of flexure of FIG. 31, similar to the view of FIG. 33, but also showing the bottoms of the PZTs.

FIG. 36 is an oblique view of flexure of FIG. 31, similar to the view of FIG. 33, but also showing the bottoms of PZTs 514.

Figure 37:
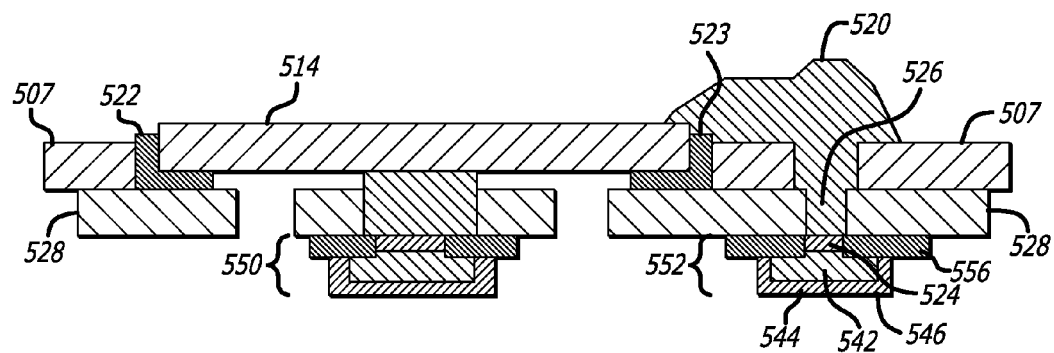
FIG. 37 is a sectional view of the suspension of FIG. 35, taken along section line D-D'.

FIG. 37 is a sectional view of the suspension of FIG. 35, taken along section line D-D'. Except for the aperture 526 which extends through both load beam portion 525 and flexure 528, and electrical contact pad 552, the structure is analogous to that of the embodiment of FIG. 29. Only the structural differences from the embodiment of FIG. 29 will be discussed. Electrical contact pad 552 of flexible circuit 560 provides to PZT 514 a path to ground. Electrical contact pad 552 includes a signal conductor 542 preferably of a copper alloy, preferably a gold layer 524 thereon, an insulator 556 such as polyimide, and an insulating coverlayer 544 of a material such as polyimide. Aperture 526 extends through both load beam 507 and flexure stainless steel portion 528, such that conductive epoxy 520 reaches from the top surface of PZT 514, which is the top and ground electrode of PZT 514, to ground electrical contact pad 552 of flexible circuit 560. Because conductive epoxy 520 touches both the stainless steel of load beam 507 which is grounded, the stainless steel portion 528 of flexure 540 which is grounded, and ground electrical contact pad 552, this embodiment provides more paths to ground and thus a lower overall resistance path to ground.

Figure 38:
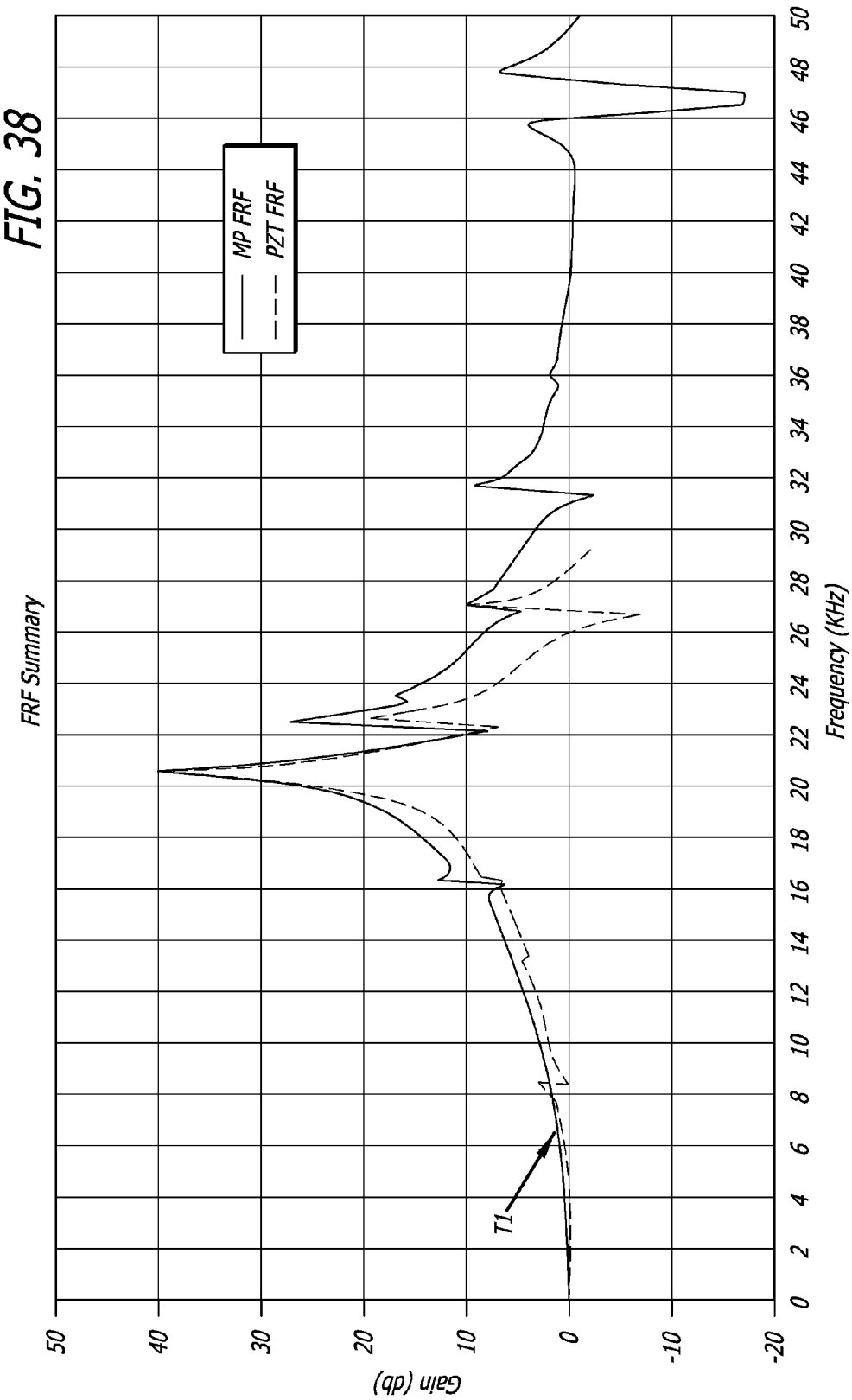
FIG. 38 is a graph of the frequency response of the suspension of FIG. 31.

FIG. 38 is a graph of the frequency response of the suspension of FIG. 31. The solid line represents the frequency response due to mount plate (MP) excitation, and the dashed line represents the frequency response as measured due to PZT voltage excitation.

FIG. 39 is an oblique view of a suspension according to an additional embodiment, referred to as Design C3, in which the ring height 676 is 0.05 mm above the nominal height of load beam rail 610.

FIG. 40 is a top plan view of the suspension of FIG. 39.

Figure 41:
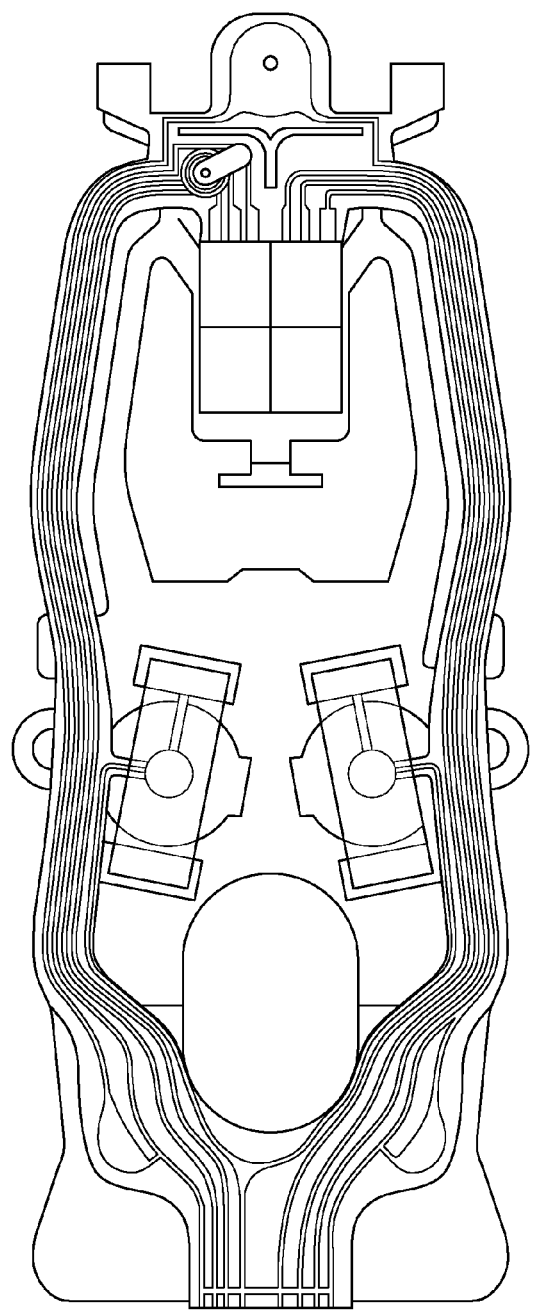
FIG. 41 is a bottom plan view of the flexure of the suspension of FIG. 39.

FIG. 41 is a bottom plan view (i.e., from what is called the gimbal bottom) of the flexure of the suspension of FIG. 39.

Figure 42:
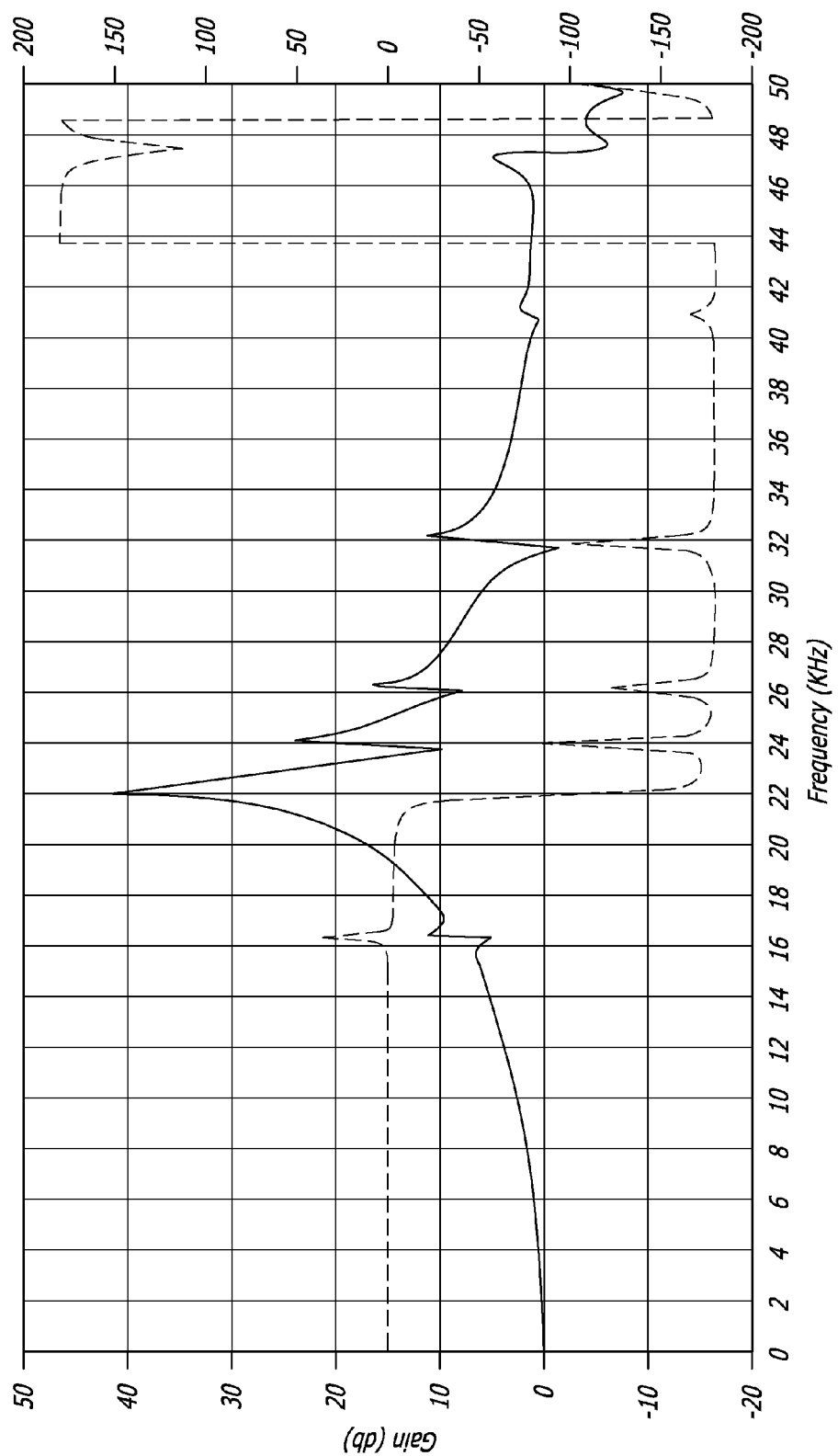
FIG. 42 is a frequency response plot for the suspension of FIG. 39.

FIG. 42 is a frequency response plot for the suspension of FIG. 39, with the following conditions applying:

| | |
|---|---|
| PZT Size = | 0.5 mm × 1.1 mm × 0.04 mm |
| PZT Signal connection clearance = | 0.23 mm |
| Ring height = | 0.5 mm |
| Stroke = | 11.9 nm/V |

This embodiment has a lower ring height, specifically 50 μm, which will not threaten to exceed the maximum suspension clearance in the Z-direction. Additionally, the sway mode leads up to 22 kHz and the overall frequency response is very clean.

Figure 43:
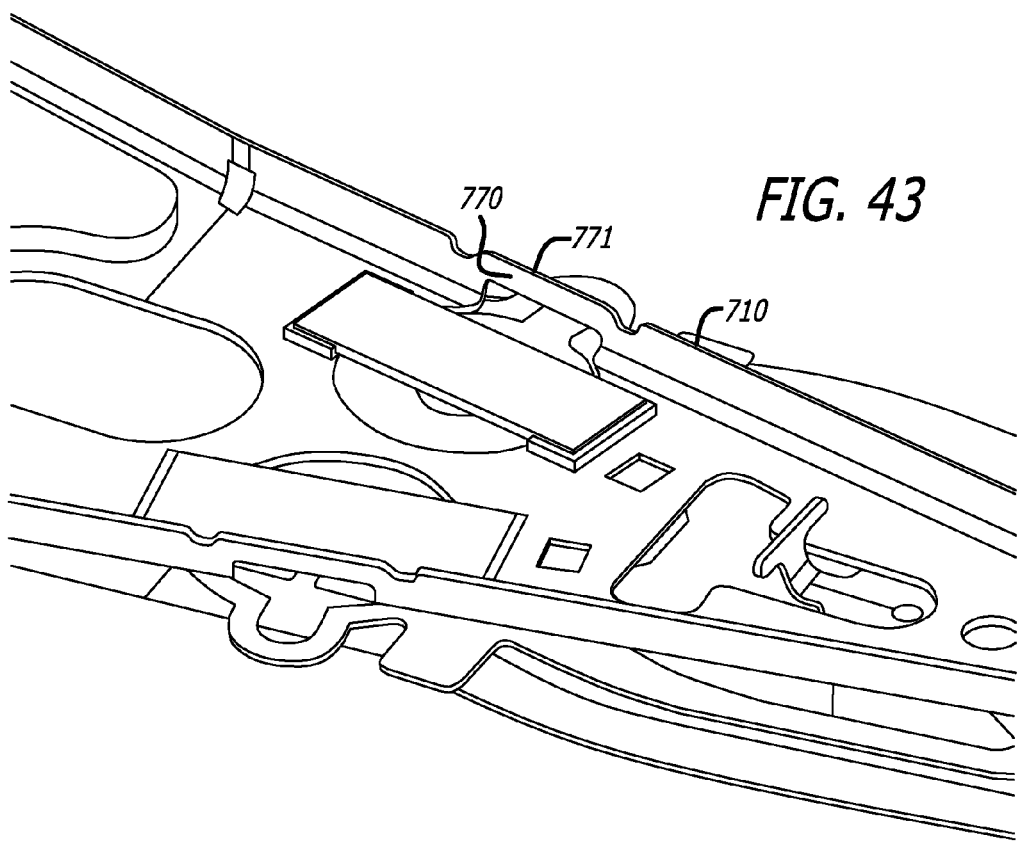
FIG. 43 is an oblique view of a suspension according to a sixth embodiment.

FIG. 43 is an oblique view of a suspension according to a sixth embodiment, referred to as Design C4, in which the ring height is 0 mm above the nominal height of load beam rail 710, that is, the top 771 of ring 770 lies at the same height as the top of rail 710.

Figure 44:
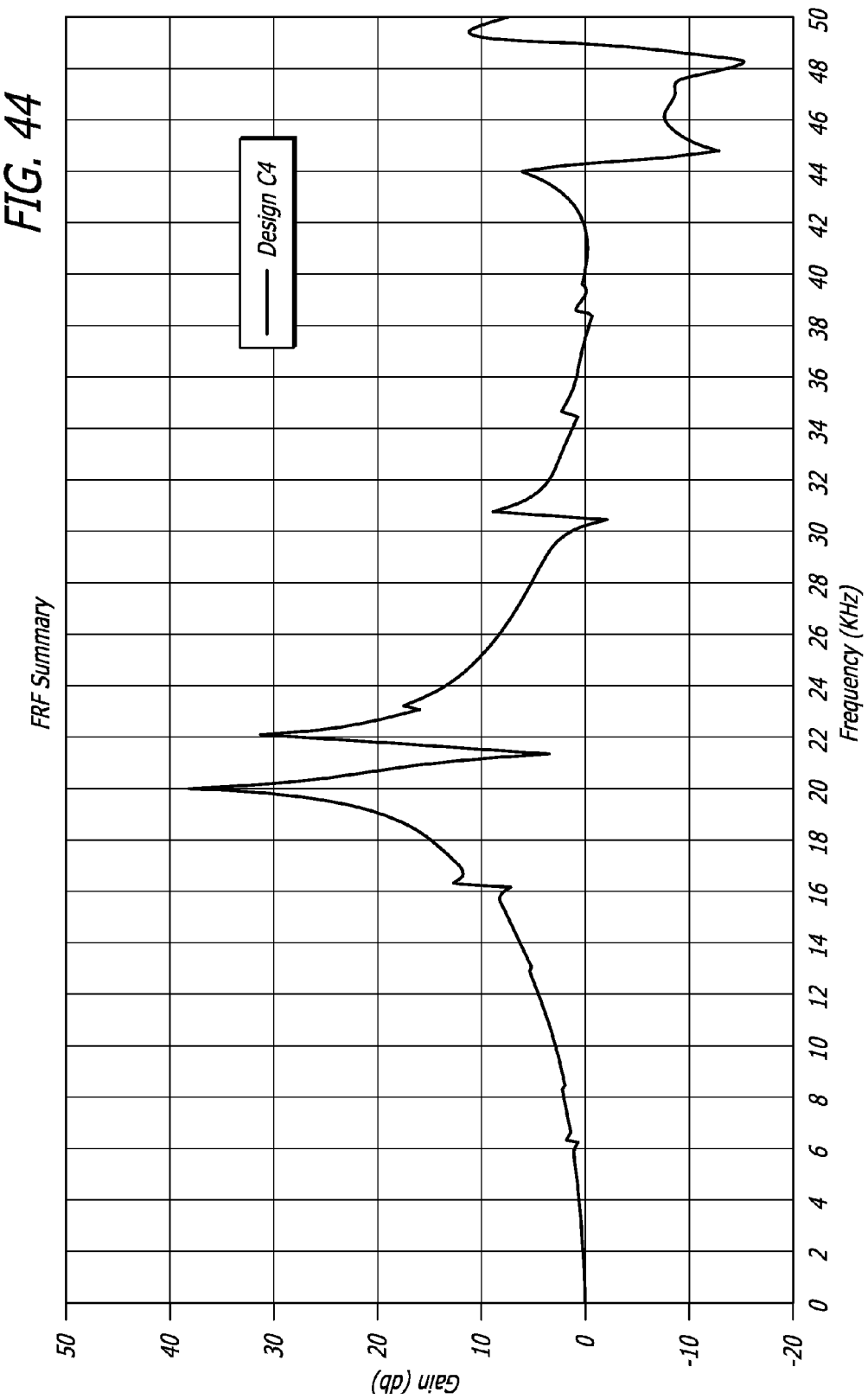
FIG. 44 is a frequency response plot for the suspension of FIG. 43.

FIG. 44 is a frequency response plot for the suspension of FIG. 43, with the following conditions applying:

| | |
|---|---|
| PZT Size = | 0.4 mm × 1.0 mm × 0.04 mm |
| Stroke = | 12.4 nm/V |

In this embodiment there are minimal changes made to the load beam, but the performance remains good.

Figure 45:
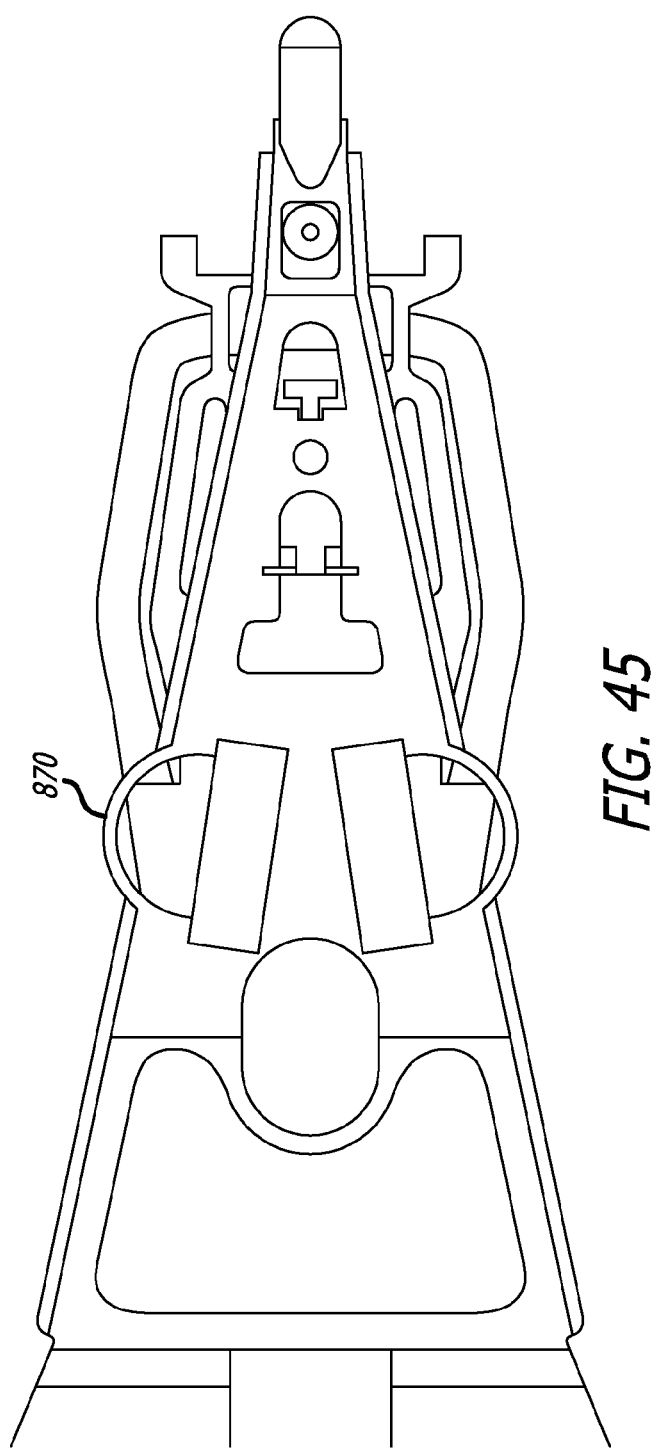
FIG. 45 is a top plan view of a suspension according to a seventh embodiment.

FIG. 45 is a top plan view of a suspension according to an additional embodiment, referred to as a "MISC Design." In this design, ring 870 extends horizontally rather than vertically. The ring size can be determined by the requirement of the stroke and the frequency response function. In order to obtain a greater stroke, the ring may be made large in order to ensure that the load beam front part has enough space to rotate during PZT actuation.

Figure 46:
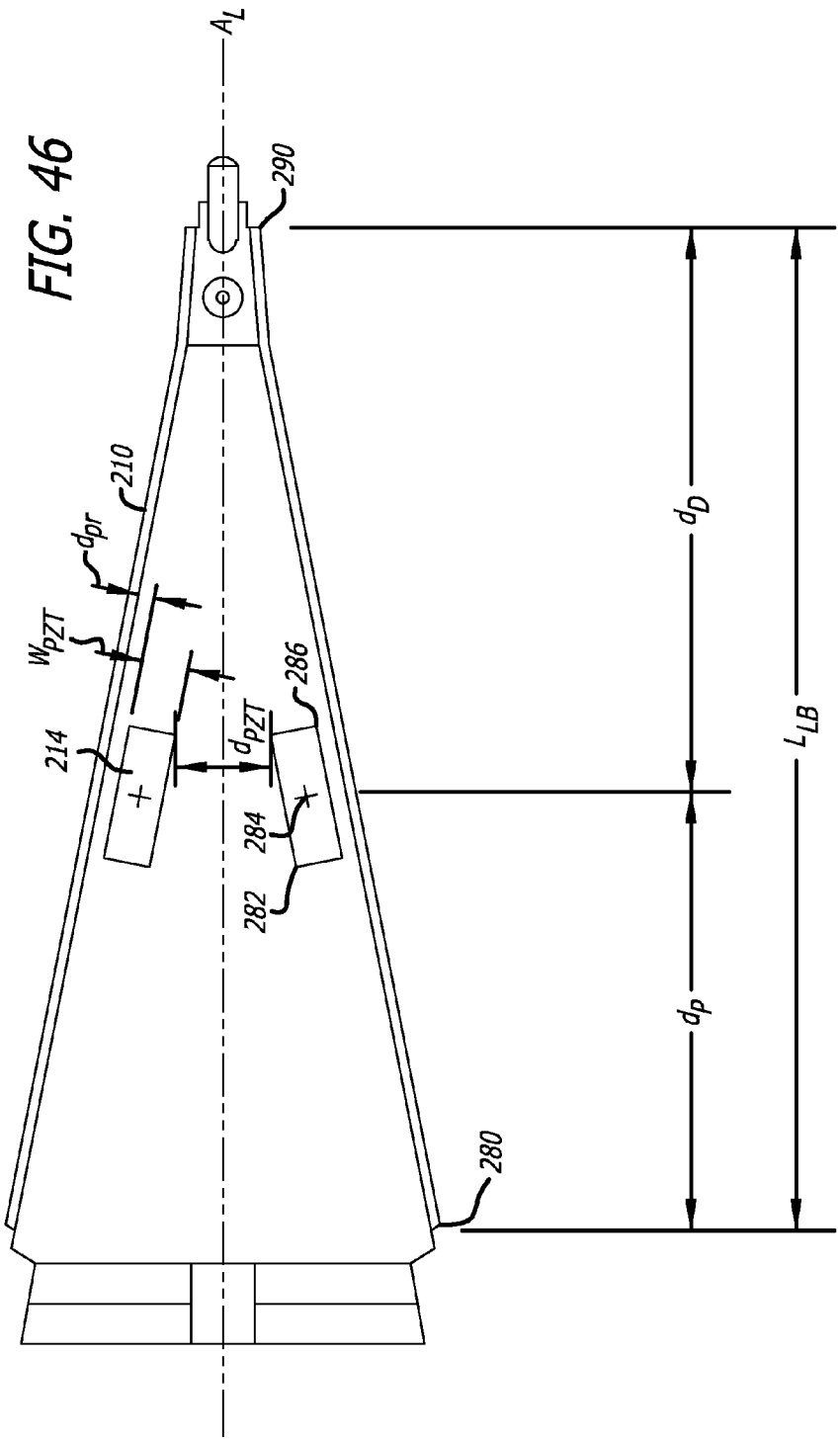
FIG. 46 is a generalized drawing illustrating the placement of the PZTs according to the invention.

FIG. 46 is a generalized drawing illustrating the placement of the PZTs according to the invention, for discussion purposes. The discussion that follows applies to any of the embodiments discussed above, except as specifically noted.

PZTs 214 are generally disposed symmetrically about longitudinal axis $A_L$. As discussed above, in the invention the PZTs are spaced near the rails. More specifically, the minimum gap $d_{PZT}$ between the PZTs 214 is at least as large as a width $W_{PZT}$ of the narrowest one of the PZTs which are nominally of the same dimensions, and can be greater or equal to 150% of the width $W_{PZT}$ of the narrowest one of the two PZTs 214 which are nominally of the same dimensions. Alternatively, or in addition, the PZTs 214 are disposed such that the distance $d_p r$ from each PZT 214 to its nearest adjacent edge rail 210 is no more than one half of the widths $W_{PZT}$ of the PZTs, and preferably no more than one third of those widths.

Another aspect of the invention is that PZTs are placed generally mid-load beam. More particularly, the distance $d_P$ from a proximal-most extent of edge rail 210 to the midpoint 284 of each microactuator 214 is within the range of 0.3-0.7 times the length $L_{LB}$ of the edge rail, and more preferably within the range of 0.35-0.5 times the length $L_{LB}$ of the edge rail. Conversely, the distance $d_D$ from the distal-most extend of edge rail 210 to the midpoint 284 of each microactuator 284 is within the range of 0.3-0.7 times the length $L_{LB}$ of the edge rail, and more preferably within the range of 0.5-0.65 times the length $L_{LB}$ of the edge rail.

In the preferred embodiment, each PZT extends generally parallel to its adjacent load beam edge rail. The proximal-most extent 282 of the PZTs is at least 25% of the distance from the proximal-most extent 280 to the distal-most extent of edge rail 210, and the distal-most extent 286 of the PZTs is at least 40% of the distance from the from the proximal-most extent 280 to the distal-most extent of edge rail 210.

It will be understood that the terms "generally," "approximately," "about," "substantially," and "coplanar" as used within the specification and the claims herein allow for a certain amount of variation from any exact dimensions, measurements, and arrangements, and that those terms should be understood within the context of the description and operation of the invention as disclosed herein.

It will further be understood that terms such as "top," "bottom," "above," and "below" as used within the specification and the claims herein are terms of convenience that denote the spatial relationships of parts relative to each other rather than to any specific spatial or gravitational orientation. Thus, the terms are intended to encompass an assembly of component parts regardless of whether the assembly is oriented in the particular orientation shown in the drawings and described in the specification, upside down from that orientation, or any other rotational variation.

It will be appreciated that the term "present invention" as used herein should not be construed to mean that only a single invention having a single essential element or group of elements is presented. Similarly, it will also be appreciated that the term "present invention" encompasses a number of separate innovations which can each be considered separate inventions. Although the present invention has thus been described in detail with regard to the preferred embodiments and drawings thereof, it should be apparent to those skilled in the art that various adaptations and modifications of the present invention may be accomplished without departing from the spirit and the scope of the invention. Accordingly, it is to be understood that the detailed description and the accompanying drawings as set forth hereinabove are not intended to limit the breadth of the present invention, which should be inferred only from the following claims and their appropriately construed legal equivalents.

We claim:

1. A dual stage actuated suspension for a disk drive, comprising:
   a base for attaching to a primary actuator;
   a hinged spring region coupled to the base;
   a load beam coupled to and distal of the hinged spring region, the load beam carrying a head for reading data from a data disk; and
   first and second microactuators for effecting fine movements of the head, the microactuators being disposed on the load beam and being separated from each other by a gap, the gap being at least as large as a width of a narrowest one of the two microactuators.

2. The dual stage actuated suspension of claim 1, wherein the gap separating the microactuators is at least 150% as large as said width of the narrowest one of the two micro actuators.

3. The dual stage actuated suspension of claim 1, wherein:
   the load beam has first and second edge rails disposed along outer edges thereof; and
   the first and second microactuators are disposed such that they each lie no more than one half of their respective widths from the first and second edge rails, respectively.

4. The dual stage actuated suspension of claim 3 wherein the first and second microactuators are disposed such that they each lie no more than one third of their respective widths from the first and second edge rails, respectively.

5. The dual stage actuated suspension of claim 3 wherein:
   the edge rails each have longitudinal extents $L_{LB}$; and
   each of the two microactuators has a respective midpoint, the midpoint lying within the range of 0.3-0.7 times $L_{LB}$ from a proximal-most extent of the microactuators' respectively adjacent edge rails.

6. The dual stage actuated suspension of claim 1, wherein:
   the load beam has upwardly extending edge rails;
   respective proximal-most extents of the microactuators are located at least 25% of a distance from a proximal-most extent of an adjacent load beam edge rail to a distal-most extent of said adjacent load beam edge rail; and
   distal-most extents of the microactuators are located at least 40% of a distance from a proximal-most extent of said adjacent load beam edge rail to a distal-most extent of said load beam edge rail.

7. The dual stage actuated suspension of claim 3 wherein:
   the edge rails each have longitudinal extents $L_{LB}$; and
   each of the two microactuators has a respective midpoint, the midpoint lying within the range of 0.35-0.50 times $L_{LB}$ from a proximal-most extent of the microactuators' respectively adjacent edge rails.

8. The dual stage actuated suspension of claim 1, further comprising:
   first and second stiffening rails disposed along outer edges of the load beam, the edge rails integrally formed with the load beam and being bent away from a major plane of the load beam, the major plane of the load beam defining a horizontal plane and the stiffening rails extending in a direction that has a vertical component;
   wherein:
   at a location that is laterally adjacent the first microactuator, the first stiffening rail has a convexly curved portion extending upwardly, the curved portion defining a spring, the spring allowing a portion of the load beam to which the first microactuator is attached to expand and contract in response to actuation of the first microactuator.

9. The dual stage actuated suspension of claim 8 wherein the curved portion of the stiffening rail comprises a vertically extending C-spring.

10. The dual stage actuated suspension of claim 9 wherein the C-spring extends above the first stiffening rail by at least 25% of a nominal height of the stiffening rail.

11. The dual stage actuated suspension of claim 10 wherein the C-spring extends above the first stiffening rail by a distance that is at least 50% of said nominal height.

12. The dual stage actuated suspension of claim 8 wherein the convexly curved spring has a height within the range of 0.3-0.6 mm above its adjacent load beam stiffening rail.

13. The dual stage actuated suspension of claim 1 wherein:
the suspension further comprises a flexure having a copper conductor separated from a stainless steel layer by an insulator; and
a ground path is provided to at least a first one of the microactuators through an aperture in the load beam to the copper conductor.

14. The dual stage actuated suspension of claim 13 wherein the ground path is further provided through an aperture within the stainless steel layer of the flexure.

15. A dual stage actuated suspension for a disk drive, comprising:
a base for attaching to a primary actuator;
a hinged spring region coupled to the base;
a load beam coupled to and distal of the hinged spring region, the load beam carrying a head for reading data from a data disk;
first and second edge rails disposed along outer edges of the load beam, the edge rails comprising folded portions of the load beam to provide stiffness to the load beam;
first and second microactuators for effecting fine movements of the head, the microactuators being disposed on the load beam and being separated from each other by a gap; and
the first and second microactuators being disposed such that they each lie no more than one half of their respective widths from the first and second edge rails, respectively.

16. The dual stage actuated suspension of claim 15 wherein the gap is at least as large as a width of a narrowest one of the two microactuators.

17. The dual stage actuated suspension of claim 15 wherein:
the edge rails each have longitudinal extents $L_{LB}$; and
each of the two microactuators has a respective midpoint, the midpoint lying within the range of 0.3-0.7 times $L_{LB}$ from a proximal-most extent of the microactuators' respectively adjacent edge rails.

18. A dual stage actuated suspension for a disk drive, comprising:
a base for attaching to a primary actuator;
a spring region coupled to the base;
a load beam coupled to the spring region, the load beam carrying a head for reading data from a data disk, the load beam having first and second stiffening rails disposed along outer edges of the load beam, the edge rails integrally formed with the load beam and being bent away from a major plane of the load beam, the major plane of the load beam defining a horizontal plane and the stiffening rails extending in a direction that has a vertical component; and
first and second microactuators disposed on and attached to the load beam, the first and second microactuators being separated by a gap therebetween;
wherein:
at a location that is laterally adjacent the first microactuator, the first stiffening rail has a convexly curved portion extending upwardly, the curved portion defining an upwardly extending spring, the upwardly extending spring allowing a portion of the load beam to which the first microactuator is attached to expand and contract in response to actuation of the first microactuator.

19. The dual stage actuated suspension of claim 18 wherein the curved portion of the stiffening rail comprises a vertically extending C-spring.

20. The dual stage actuated suspension of claim 19 wherein the C-spring extends above a nominal height of the first stiffening rail by a distance that is at least 25% of said nominal height.

* * * * *